US012603792B2

(12) United States Patent
Green

(10) Patent No.: US 12,603,792 B2
(45) Date of Patent: Apr. 14, 2026

(54) SYSTEMS AND METHODS FOR ENFORCING COMPLIANCE OR PRIVATE TRANSACTIONS

(71) Applicant: Sealance Corp., Miami, FL (US)

(72) Inventor: Matthew Green, Miami, FL (US)

(73) Assignee: Sealance Corp., Miami, FL (US)

(*) Notice: Subject to any disclaimer, the term of this patent is extended or adjusted under 35 U.S.C. 154(b) by 407 days.

(21) Appl. No.: 18/517,911

(22) Filed: Nov. 22, 2023

(65) Prior Publication Data

US 2024/0179020 A1 May 30, 2024

Related U.S. Application Data

(60) Provisional application No. 63/385,059, filed on Nov. 28, 2022.

(51) Int. Cl.
H04L 9/00 (2022.01)
H04L 9/32 (2006.01)

(52) U.S. Cl.
CPC .............. H04L 9/50 (2022.05); H04L 9/3218 (2013.01); H04L 9/3239 (2013.01)

(58) Field of Classification Search
CPC ........ H04L 9/50; H04L 9/3218; H04L 9/3239
See application file for complete search history.

(56) References Cited

U.S. PATENT DOCUMENTS

| | | | | |
|---|---|---|---|---|
| 11,416,418 B2* | 8/2022 | Sun | ....................... | H04L 9/3239 |
| 11,720,891 B2* | 8/2023 | Madisetti | .............. | H04L 63/061 |
| | | | | 705/71 |
| 12,307,453 B2* | 5/2025 | Jivanyan | ................. | H04L 63/12 |
| 12,445,287 B2* | 10/2025 | Wright | ..................... | H04L 9/50 |
| 2009/0217368 A1* | 8/2009 | Buss | ....................... | G06F 21/34 |
| | | | | 726/9 |
| 2014/0032259 A1 | 1/2014 | Lafever et al. | | |
| 2019/0164151 A1 | 5/2019 | Doney et al. | | |

(Continued)

FOREIGN PATENT DOCUMENTS

WO 2024/118439 A1 6/2024

OTHER PUBLICATIONS

Bowe, S., et al., "Zexe: Enabling Decentralized Private Computation", 2020 IEEE Symposium on Security and Privacy (SP), Mar. 30, 2021, 67 pages.

(Continued)

*Primary Examiner* — Azizul Choudhury
(74) *Attorney, Agent, or Firm* — Hamilton, Brook, Smith & Reynolds, P.C.

(57) ABSTRACT

A computer-based system, method, and computer program product for permissioning private transactions on a public network. The system and method including a blockchain privacy network having a computer processor configured to execute a policy enforcement computing system by using at least one compliance zero-knowledge proof, enforcing compliance of a private transaction on a blockchain network with a predefined policy. The system and method controlling an identity by issuing a decentralized private credential (DPC) to a verified user, integrating an identity assertion into the decentralized private credential (DPC), the identity assertion associated with the verified user, and verifying the identity assertion by using a verification zero-knowledge proof.

43 Claims, 14 Drawing Sheets

(56) References Cited

U.S. PATENT DOCUMENTS

| | | | | |
|---|---|---|---|---|
| 2020/0167775 | A1* | 5/2020 | Reese .............. | G06Q 20/38215 |
| 2020/0322132 | A1* | 10/2020 | Covaci .................. | H04L 9/0637 |
| 2021/0217001 | A1* | 7/2021 | Harrison ................... | H04L 9/50 |
| 2021/0374693 | A1 | 12/2021 | La Salle | |
| 2022/0188822 | A1* | 6/2022 | Guzhevskiy ............ | G06F 21/53 |
| 2022/0368538 | A1* | 11/2022 | Gauthier ............... | H04L 9/3263 |
| 2023/0162176 | A1* | 5/2023 | Pettit .................. | G06Q 20/3678 |
| | | | | 705/69 |
| 2024/0104521 | A1* | 3/2024 | Azgad-Tromer ............................ | |
| | | | | G06Q 20/4016 |
| 2024/0413984 | A1* | 12/2024 | Rindal ................... | H04L 9/085 |

OTHER PUBLICATIONS

Chainlink, "Zero-Knowledge Proof (ZKP)", Education, Published Jul. 21, 2021 | Updated Jan. 24, 2023, 10 pages.
International Search Report and Written Opinion received for PCT Patent Application No. PCT/US2023/080970, mailed on Mar. 13, 2024, 7 pages.
Kaptchuk, G., et al., "Giving State to the Stateless: Augmenting Trustworthy Computation with Ledgers", Cryptology ePrint Archive, 2017, 35 pages.
Salleras, X., et al., "ZPiE: Zero-Knowledge Proofs in Embedded Systems", Mathematics , vol. 9, No. 20, 2021, 17 pages.
Unruh, D., "Non-Interactive Zero-Knowledge Proofs in the Quantum Random Oracle Model", Lecture Notes in Computer Science, vol. 9057, Jan. 1, 2015, 30 pages.

* cited by examiner

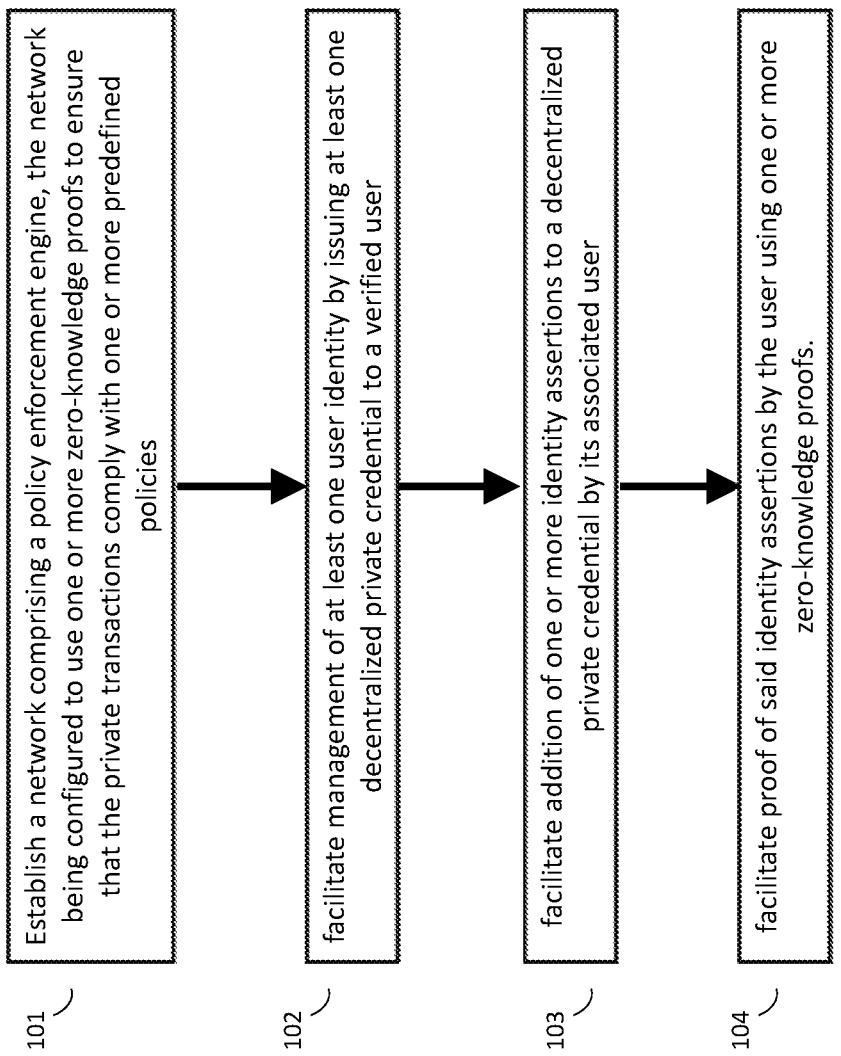

101 — Establish a network comprising a policy enforcement engine, the network being configured to use one or more zero-knowledge proofs to ensure that the private transactions comply with one or more predefined policies 102 — facilitate management of at least one user identity by issuing at least one decentralized private credential to a verified user 103 — facilitate addition of one or more identity assertions to a decentralized private credential by its associated user 104 — facilitate proof of said identity assertions by the user using one or more zero-knowledge proofs.

SYSTEMS AND METHODS FOR ENFORCING COMPLIANCE OR PRIVATE TRANSACTIONS

RELATED APPLICATION

This application claims the benefit of U.S. Provisional Application No. 63/385,059, filed on Nov. 28, 2022. The entire teachings of the above application are incorporated herein by reference.

BACKGROUND

A blockchain may be implemented as a peer-to-peer (P2P), electronic ledger that is implemented as a computer-based decentralized, distributed system made up of blocks, which, in turn, are made up of transactions. Each transaction may be a data structure that encodes a transfer of control of a digital asset between participants in the blockchain system, and that includes at least one input and at least one output. Each block may contain a hash of a previous block so that blocks become chained together to create a permanent, unalterable record of all transactions that have been written to the blockchain since its inception. Transactions may contain small programs, known as scripts, embedded into their inputs and outputs; the scripts may specify how and by whom the outputs of the transactions can be accessed.

Blockchain may be used for implementation of "smart contracts" that can be associated with digital asset. These are computer programs designed to automate execution of terms of a machine-readable contract or agreement. Unlike a traditional contract, which would be written in natural language, a smart contract is a machine-executable program that may include rules for processing inputs to generate results; these results may then cause actions to be performed depending upon those results. With respect to commercial transactions, for example, these may involve a transfer of property rights and/or assets.

An area of blockchain-related interest is the use of "tokens" to represent and transfer assets via the blockchain. A token serves as an identifier that allows an asset to be referenced from the blockchain. Fungible tokens are uniform. In other words, fungible tokens of the same type are identical in specification, and each fungible token is identical to another fungible token of the same type. Fungible tokens may be divisible into smaller amounts. Similar to currency, where bills can be divided into coins of an equivalent value, fungible tokens may be divisible. Non-fungible tokens (NFTs), however, cannot be replaced with other tokens of the same type. NFTs represent non-fungible assets. Non-fungible assets have unique information or attributes. Each NFT is unique and differs from other tokens of the same class, and, unlike a fungible token, NFTs typically cannot be divided. Blockchain gaming systems may use tokens or NFTs to create different parts of the game, such as rules, characters, weapons, and skins.

Cryptocurrency wallets may be implemented to securely store and manage blockchain assets, tokens, NFTs, and cryptocurrencies. These wallets may allow users to spend, receive, and trade digital assets.

SUMMARY

While the financial services industry has made limited experiments with private blockchain technology, it has been slow to adopt public blockchain technology for mainstream applications. Until recently, public blockchains have been subject to a number of limitations that made these systems inappropriate for large-scale applications such as payments. These limitations include, for example, scalability and price volatility.

Many of these concerns are now being addressed. For example, scaling concerns are now being relieved by a new generation of high-throughput systems including rollup-based technology and new consensus mechanisms. Similarly, the widespread adoption of government-regulated, asset-backed currencies such as United States Dollar Coin (USDC), Paxos Dollar (USDP), and Gemini Dollar (GUSD) provide a clear interface to the traditional financial system. Indeed, these systems are more clearly viewed as a form of tokenized deposit—a system in which ownership of fiat deposits is managed through public blockchains—rather than currencies in their own right.

While scalability improvements and stablecoins clear many of the barriers that stand in the way of widespread digital asset adoption, several critical barriers remain. These challenges are quite fundamental. Accordingly, the need to ensure the privacy of asset transfers, without sacrificing the ability to ensure regulatory compliance for digital assets, is paramount. Moreover, adopters need assurance that the ledgers and blockchains they adopt are safe—namely, that the flows of assets on those public blockchains can be sufficiently isolated and monitored such that user funds are not subject to fraud or criminal activity.

Modern blockchains can be divided into two categories: permissionless blockchains (also called "public blockchains") and permissioned blockchains (also called "private blockchains"). The difference between these two categories may be defined by which parties are authorized to submit transactions, transact freely, and/or deploy new decentralized finance (DeFi) applications. In permissioned blockchains, users must pass access control checks in order to access the system. A benefit of the permissioned approach is that individual users/wallets can then be identified; this can enforce compliance-related applications such as "know your customer" (KYC) enforcement and investigation. A disadvantage is that these blockchains must select a mechanism for access control. Once this method is chosen, all users in the system must be capable of meeting this basic requirement. The result is often fragmentation of liquidity and lack of interoperability.

An example embodiment is directed to a computer-based system for permissioning private transactions on a public blockchain network, the system including a blockchain privacy network having multiple nodes, at least one of the multiple nodes of the blockchain privacy network having a computer processor configured to execute a policy enforcement computing system. The policy enforcement computing system is configured to use at least one compliance zero-knowledge proof, enforce compliance of at least one private transaction occurring on a blockchain network with at least one predefined policy, control at least one user identity by issuing a decentralized private credential (DPC) to a verified user, integrate at least one identity assertion associated with a verified user into the decentralized private credential (DPC), and verify the identity assertion using at least one verification zero-knowledge proof.

In an embodiment, to increase transactions per second, the decentralized private credential (DPC) can enable the blockchain privacy network to scale, as it can allow for faster transaction processing times while still maintaining the security and decentralization of the blockchain network.

In an embodiment, a computer-based system can be provided for permissioning private transactions on a public blockchain network, where the policy enforcement system is implemented on a compliance layer, and the compliance layer is implemented on at least one of a trusted platform module, a hardware security module, an oracle, or a virtual machine.

An example embodiment is directed to a computer-based system for permissioning private transactions on a public blockchain network, where the policy enforcement computing system enforces at least one predefined policy, the policy of the policy enforcement computing system is configured to enable a user to selectively reveal information to another party on the blockchain.

An example embodiment is directed to a computer-based system for permissioning private transactions on a public blockchain network, the system allows for identity discovery of parties on the blockchain, and establishes an identity on the network by constructing a derived personal identity verification credential, identifies and removes duplicate derived personal identity verification credentials; verifies derived personal identity verification credentials, and discovers identities of parties on the blockchain based on their verified derived personal identity verification credentials.

An example embodiment is directed to a computer-based system for permissioning private transactions on a public blockchain network, where the policy enforcement system is on a privacy network and is further configured to use an optimistic rollup-based approach for computing a large number of transactions.

An example embodiment is directed to a computer-based system for permissioning private transactions on a public blockchain network, where the policy enforcement system may be further configured to process information in a certificate or a transaction in a manner reconfigurable by a user.

An example embodiment is directed to a computer-based system for permissioning private transactions on a public blockchain network, where the policy enforcement system is located on a privacy network and manages user identities using decentralized private credentials.

An example embodiment is directed to a computer-based system for permissioning private transactions on a public blockchain network, where the policy enforcement system is on a privacy network and is configured to operate a distributed user discoverability network in combination with identity management.

An example embodiment is directed to a computer-based system for permissioning private transactions on a public blockchain network, where the policy enforcement system is on a privacy network and is configured to record each identity using a decentralized private credential, the decentralized private credential includes at least one of, proof-of-ownership of specific wallets, verified ownership of an email address, verified ownership of a phone number, or full government-ID-verified know-your-customer assertions made by trusted identity providers.

An example embodiment is directed to a computer-based system for permissioning private transactions on a public blockchain network, where the policy enforcement system is on a privacy network and is configured to manage transactions by verifying that the transaction complies with at least one programmable policy that determines whether the transaction is compliant.

An example embodiment is directed to a computer-based system for permissioning private transactions on a public blockchain network, where the policy enforcement system is on a privacy network, and the privacy network comprises a programmable zero-knowledge smart contract.

An example embodiment is directed to a computer-based system for permissioning private transactions on a public blockchain network, where the policy enforcement system is on a privacy network, the privacy network being configured to allow individual senders and/or recipients to opt into policy enforcement.

An example embodiment is directed to a computer-based system for permissioning private transactions on a public blockchain network, where the policy enforcement system is on a privacy network, the privacy network being configured to use dedicated domain-specific language for specifying policy requirements.

An example embodiment is directed to a computer-based system for permissioning private transactions on a public blockchain network, where the policy enforcement system is on a privacy network, the privacy network being configured to facilitate policy enforcement using zero-knowledge by combining the policy enforcement system with the transaction privacy system.

An example embodiment is directed to a computer-based system for permissioning private transactions on a public blockchain network, where a transaction can be organized into a sealed pool, a pool-wide policy is enforced by ensuring that each user has a decentralized private credential (DPC) identity of a sufficient grade for transacting in the sealed pool.

An example embodiment is directed to a computer-based system for permissioning private transactions on a public blockchain network, where a transaction can be organized into a sealed pool and a pool-wide policy is enforced by placing limitations on transaction amounts according to identity quality.

An example embodiment is directed to a computer-based system for permissioning private transactions on a public blockchain network, where a transaction can be organized into a sealed pool and a pool-wide policy is enforced by enabling investigatory capability as a user opt-in.

An example embodiment is directed to a computer-based system for permissioning private transactions on a public blockchain network, where the computer processor is a secure cryptoprocessor implemented with a CPU/Zero Knowledge Processing Unit (ZPU) having an embedded optimistic Zero Knowledge verifier based hardware accelerator.

An example embodiment is directed to a computer-based system for permissioning private transactions on a public blockchain network, where the privacy network is further configured to manage user identity by recoding each user identity using Decentralized Private Credentials (DPC) to create an accretive and nontransferable record that belongs to a single user, the Decentralized Private Credentials (DPC) including a set of assertions about the user including at least one proofs-of-ownership of specific wallets on one or more computing networks, verified ownership of an email address, a phone number attested to by a validator committee, and full government-ID-verified know your wallet (KYC) assertions made by trusted identity providers.

An example embodiment is directed to a computer-based system for permissioning private transactions on a public blockchain network, where the assertions are stored on-chain in an encrypted format.

An example embodiment is directed to a computer-based system for permissioning private transactions on a public blockchain network, further enabling a user to verify the assertions using a zero-knowledge succinct non-interactive argument of knowledge (zkSNARK) proof.

An example embodiment is directed to a computer-based system for permissioning private transactions on a public blockchain network, where the privacy network is configured to provide a cross-network system for building and proving identity, which can be used on external decentralized or centralized systems.

An example embodiment is directed to a computer-based system for permissioning private transactions on a public blockchain network, where the privacy network is further configured to require know your customer (KYC)/identity attestations to process transactions, enabling interaction between permissioned applications and open decentralized assets/applications.

An example embodiment is directed to a computer-based system for permissioning private transactions on a public blockchain network, where the privacy network includes a policy enforcement computer system configured to enforce privacy policies using a zero-knowledge proof, such that privacy policy enforcement is executed without the policy enforcement computing system revealing private information related to the transaction including an amount, recipient, and sender data related to the transaction.

In an example, a computer-based system may be provided for permissioning private transactions on a public blockchain network, where the privacy network may be configured to implement transaction privacy using an unspent transaction output (UTXO)-based payment privacy layer derived from zero-knowledge succinct non-interactive argument of knowledge (zkSNARK) proofs, this layer focusing primarily on the transfer of value between accounts, enabling users to access (nonprivate) decentralized finance (DeFi) systems using private transfers of funds.

Some embodiments include a computer-implemented method for permissioning private transactions by applications on a public blockchain. The method includes a blockchain privacy network having multiple nodes, at least one of the multiple nodes of the blockchain privacy network having a computer processor configured to execute a policy enforcement computing method. The policy enforcement computing system is configured to use at least one compliance zero-knowledge proof, enforce compliance of at least one private transaction occurring on a blockchain network with at least one predefined policy, control at least one user identity by issuing a decentralized private credential (DPC) to a verified user, integrate at least one identity assertion associated with a verified user into the decentralized private credential (DPC), and verify the identity assertion using at least one verification zero-knowledge proof.

Alternative method and computer program product embodiments may parallel those described above in connection with the example computer-based system embodiments.

It should be understood that example embodiments disclosed herein can be implemented in the form of a computer-implemented method, apparatus, computer-based system, or computer program product.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 10 is a flow diagram of an exemplary computer-based system/method for permissioning private transactions on a public blockchain network according to an embodiment.

DETAILED DESCRIPTION

Figure 1:
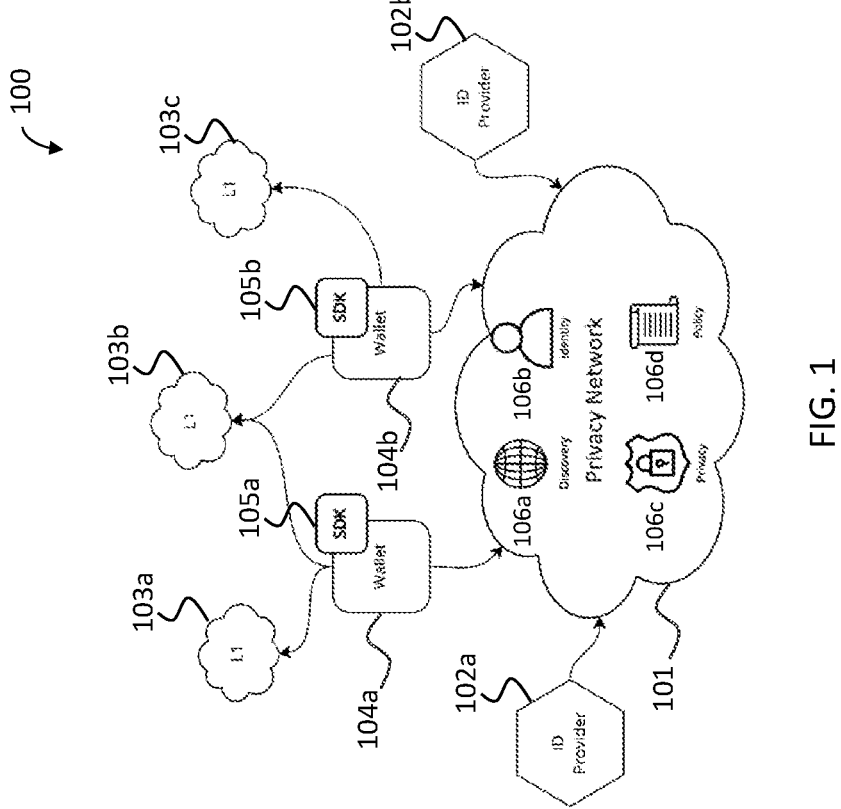
FIG. 1 illustrates an example embodiment of a system including a privacy network.

A description of example embodiments follows.

In general, blockchain is a write-once, append-many type electronic ledger. Blockchain is an architecture that allows disparate users to make transactions and creates an unchangeable record of those transactions. To move anything of value over any kind of blockchain, a network of nodes must first agree that a corresponding transaction is valid. As a peer-to-peer (P2P) network, combined with a distributed time-stamping server, blockchain ledgers can be managed autonomously to exchange information between disparate parties; there is no need for an administrator. In effect, the blockchain users are the administrator.

Blockchain's rapid development has given rise to many different kinds of chains, leading to cross-chain technology. Cross-chain, as its name suggests, allows the transmission of value and information between different blockchains. According to an example embodiment, a digital asset may be exchanged, cross-chain, securely, and despite differences between constraints or rules of operation that may be established for the different blockchains. Such a digital asset may be in the form of a token, which may be fungible, or may be a non-fungible token (NFT). Such constraints or rules may be in the form of smart contracts, or other forms. Differences between such constraints or rules may include disparate levels of rigor or leniency of such constraints or rules between or among different blockchain networks.

In some embodiments, blockchain may be a peer-to-peer (P2P), electronic ledger that is implemented as a computer-based decentralized, distributed system made up of blocks, which, in turn, are made up of transactions. Each transaction may be a data structure that encodes a transfer of control of a digital asset between participants in the blockchain system, and that includes at least one input and at least one output. Each block may contain a hash of a previous block so that blocks become chained together to create a permanent, unalterable record of all transactions that have been written to the blockchain since its inception. Transactions may contain small programs, known as scripts, embedded into their inputs and outputs; the scripts may specify how and by whom the outputs of the transactions can be accessed.

For a transaction to be written to the blockchain, it must be "validated." Network nodes (miners) may perform work to ensure that each transaction is valid, with invalid transactions being rejected from the network. Software clients installed on the nodes may perform this validation work on an unspent transaction (UTXO) by executing its locking and unlocking scripts. If execution of the locking and unlocking scripts evaluates to TRUE, the transaction is valid and is written to the blockchain. Thus, for a transaction to be written to the blockchain, it should be: (i) validated by a first node that receives the transaction—e.g., if the transaction is validated, the node relays it to other nodes in the network; (ii) added to a new block built by a miner; and (iii) mined, e.g., added to the public ledger of past transactions.

Blockchain may be used for implementation of "smart contracts" that can be associated with digital asset. These are computer programs designed to automate execution of terms of a machine-readable contract or agreement. Unlike a traditional contract, which would be written in natural language, a smart contract is a machine-executable program that may include rules for processing inputs to generate results; these results may then cause actions to be performed depending upon those results. With respect to commercial transactions, for example, these may involve a transfer of property rights and/or assets. Such assets may include real property, personal property (including both tangible and intangible property), digital assets such as software, or any other type of asset. In the digital economy, there is often an expectation that exchanges and transfers will be performed in a timely manner and across vast distances. This expectation, along with practical, technical limitations, means that traditional forms of asset transfer, such as physical delivery of hardcopy of documents representing a contract, negotiable instrument, etc., or a tangible asset itself, are not desirable. Thus, smart contracts can provide enhanced control, efficiency, and speed of transfer.

An area of blockchain-related interest is a use of "tokens" to represent and transfer assets via the blockchain. A token thus serves as an identifier that allows a real-world item to be referenced from the blockchain. Through an initial coin offering (ICO) model, startups may raise capital by issuing tokens on a blockchain, such as Ethereum, and distributing them to token buyers in exchange for making a financial contribution to a project. These tokens, which may be transferred across a network and traded on cryptocurrency exchanges, may serve a multitude of different functions, from granting holders access to a service to entitling them to company dividends. Depending on their function, tokens may be classified as security tokens or utility tokens.

Further, similar to physical assets, the tokens that represent them may have many properties, one of which is fungibility or non-fungibility. In economics, fungibility refers to equivalence or interchangeability of each unit of a commodity with other units of the same commodity. Fungible tokens (FTs) are tokens that can be exchanged for any other token with the same value.

Fungible tokens are uniform, that is, FTs of the same type are identical in specification. In other words, each fungible token (FT) is identical to another FT of the same type, and FTs are divisible into smaller amounts. Similar to currency, where bills can be divided into coins of an equivalent value, FTs are divisible. As such, a fraction of an FT can be transferred between users. Nonfungible tokens (NFTs), however, cannot be replaced with other tokens of the same type. NFTs represent nonfungible assets, e.g., assets that have unique information or attributes. Each NFT is unique and differs from other tokens of the same class. For example, while plane tickets from and to a same destination may look the same, each one has a different passenger name, seat number, etc., and, therefore, is unique. In contrast to FTs, NFTs cannot be divided, an elementary unit of the NFT is the token itself.

Due to an immutable nature of transaction histories supported by blockchain networks, it is possible to extend the aforementioned validation steps of such transactions so that the transactions become subject to certain rules that reference prior transactions, or even aspects of an initial creation of a subject digital asset, e.g., NFT. An example of such rules is an arrangement wherein royalties are paid to a creator of a digital asset each time the digital asset is sold to a subsequent owner. Such royalty payment arrangements may be implemented as a function with which the blockchain network is programmed, or using a reference table loaded into a computer memory element of the blockchain network, as a smart contract as described hereinabove, or by other means.

A further use case for cryptocurrency exchanges on a blockchain network is that such exchanges can protect transactions—similar to a manner in which a surety bond would. A surety bond or surety is a promise by a surety or guarantor to pay one party a certain amount if a second party fails to meet some obligation, such as fulfilling terms of a contract. The surety bond protects an obligee against losses resulting from a principal's failure to meet the obligation. As cryptocurrencies evolve from fringe investments to mainstream instruments, surety bonds may become an increasingly common requirement for those looking to trade in virtual currencies.

Ordinary surety bonds act as a contract between three parties: (i) an entity requesting the bond (principal), (ii) the bond's beneficiary (obligee), and (iii) a company issuing the bond. What a surety bond does is guarantee that the principal will fulfill its obligations, whether it's completing a long-term project or processing a financial transaction, or else forfeit the bond. Cryptocurrency surety bonds work in the same basic manner, ensuring that the principal performs cryptocurrency transactions as expected, or else forfeits the bond. In this case, the contract is between an entity handling a virtual currency transaction, a regulatory entity requiring the surety bond, and a surety bond provider.

A composable digital asset integrates two or more individual digital assets into a new combined form, which may be referred to as an asset cluster. An asset cluster may comprise components of similar or different types. For example, an asset cluster may include an element of fungible currency such as cryptocurrency, along with a non-fungible token (NFT). Thus, combining an amount of cryptocurrency with an NFT may effectively establish a floor price for the NFT equal to the value of the fungible cryptocurrency.

Such composable assets may find applications in areas such as finance and gaming. An example embodiment of a gaming application of composable digital assets may involve a piece of armor having a socket, into which a gem may be placed, creating an asset cluster. Asset clusters may be decomposed at any time such that the NFT and the currency item again become separate entities on a digital exchange platform.

Composable digital assets may provide liquidity for any digital asset or token. For example, a player of a game incorporating composable digital asset clusters may use a currency component of a cluster to set an instantaneous price at which to sell the cluster, such as to an automated market maker (AMM) associated with the game. Composable assets may be referenced or required by contracts or rules governing transactions on a digital exchange platform, such as smart contracts.

An AMM cryptographic system may be configured to provide liquidity to a platform enabling exchange of digital assets as described herein. The exchange platform may be decentralized. Liquidity may be provided using underlying collateral. An AMM cryptographic system may take in and store different forms of digital assets, such as loans, to be used as collateral in future exchanges on the platform. Such assets may be aggregated within a collateral pool, such that liquidity is pooled in association with the exchange platform. Liquidity may thus be pooled and aggregated on a blockchain supporting the collateral pool. Assets may be withdrawn from the collateral pool upon minting a collateral token. The collateral token may thus consolidate liquidity for an exchange within one protocol or contract. In addition, the collateral token may provide liquidity for a one-to-one exchange with a user looking to sell or redeem a user-held token.

In an embodiment, a compliance enforcement system implemented upon a platform may be configured to force an exchange to be performed on the platform such that the exchange is managed by an AMM cryptographic system. A machine learning (ML) oracle of the AMM cryptographic system may set a computational value for a collateral token, and may offer the collateral token for exchange at such a computational value, thus computing the market value for that token, rather than deferring to market forces. The AMM cryptographic system may function with either a bounded or an unbounded token supply, providing continuous liquidity. In addition, the AMM cryptographic system may be configured to measure supply and demand for tokens on the platform, including the collateral tokens. The AMM cryptographic system may be configured with an encoder/decoder. The AMM cryptographic system encoder may be configured to mint and/or encode collateral tokens.

The AMM cryptographic system may be implemented by any suitable protocol known to those of skill in the art, such as ERC-20, among other examples.

A digital asset marketplace may leverage a compliance enforcement system to enforce a contract governing transfer of tokens between electronic wallets. The contract may specify royalties to be paid to an original creator of a token upon transactions involving that token. In addition, the contract may include a revenue share table. The compliance enforcement system may be configured to enforce the contract regardless of network locations of two parties involved in a transaction, and regardless of whether or not the transaction is conducted within a digital asset marketplace. For example, even offline exchanges may be made transparently viewable from within the digital asset marketplace. The compliance enforcement system may be configured to serve any token creator. The compliance enforcement system may include a minimax recursive algorithm to facilitate a threshold value associate with the token.

In another embodiment, upon creation of a token, a threshold value of that token may be set within the digital asset marketplace. The compliance enforcement system may implement rules in conjunction with the threshold value to prevent a value of the token from experiencing dramatic changes characteristic of backdoor or offline transactions. As such, the threshold value may act as a floor price of the token required to activate any transaction involving the token. The compliance enforcement system may manage and approve or deny transactions accordingly. Rules such as threshold values may be based on a bounded percentage of a price change from a previous transaction. Such a compliance enforcement system may be implemented in a decentralized manner, for instance, with a smart contract. A central authority is thus not required.

Certain embodiments may offer techniques for verifying or checking an identity that protect, preserve, and maintain privacy. Safeguarding privacy within blockchain networks is an important consideration for traditional institutions such as banks and other financial institutions that may desire to interact with and/or launch smart contracts, for example, as part of digital asset transactions, but may also need to keep trade secrets and/or sensitive customer information etc. confidential. As to the latter, such institutions may also be required to comply with rules and/or regulations including, but not limited to, the Europe Union's General Data Protection Regulation (GDPR) and the United States' Health Insurance Portability and Accountability Act (HIPAA), among other examples.

In an example embodiment, the compliance enforcement system may be accomplished by use of, e.g., a "zero-knowledge proof" (ZKP). A zero-knowledge proof implementation in the compliance enforcement system ensures enforcement of encoded rules configured in NFT assets utilizing a technique whereby a first entity (or "prover"), such as first transacting entity, a first wallet etc., may cryptographically prove to a second transacting entity (or "verifier") that the first entity possesses knowledge regarding certain information regarding the encoded rules in configured in the NFT, without also disclosing the actual contents of the information.

Zero-knowledge proofs may be interactive or non-interactive. An interactive ZKP requires interaction between a prover entity and a verifier entity involved in an NFT encoded rule enforcement transaction processed by the compliance enforcement system. A non-interactive ZKP may be constructed from any interactive scheme by relying on, e.g., a Fiat-Shamir heuristic, or any other suitable technique known to those of skill in the art.

According to an embodiment, a protocol implementing ZKPs may be presented as a transcript where a prover (first entity) responds to interactive inputs from a verifier (second entity). In one such embodiment, the interactive input may be in the form of one or more challenges such that responses from the prover will convince the verifier if and only if a statement is true, e.g., if the prover does possess certain claimed knowledge.

In the context of blockchain networks, according to some embodiments, by employing a ZKP, the only information divulged on-chain is that some piece of undisclosed information is (i) valid and (ii) known by the prover with a high degree of certainty. As such, in an embodiment, zero-knowledge proofs may be used by various blockchains to furnish privacy-maintaining digital asset transactions, whereby, for example, a transaction's amount, sender electronic wallet identifier, and receiver electronic wallet identifier are kept secret. Furthermore, some embodiments relate to oracle networks that provide smart contracts with access to off-chain data and/or computing infrastructure. Such oracle networks may also employ ZKPs to prove a certain fact about off-chain data, without divulging the data itself on-chain. A method used for performing non-interactive ZKPs may be as described in D. Unruh, "Non-Interactive Zero Knowledge Proofs in the Random Oracle Model," in EUROCRYPT 2015, 2015, pp. 755-84, which is herein incorporated by reference in its entirety.

Further, a method for creating and executing ZKP applications in embedded systems may be as described in Salleras, et al., "ZPIE: Zero-Knowledge Proofs in Embedded Systems," Mathematics, vol. 9, no. 20, p. 2569, 2021, which is herein incorporated by reference in its entirety.

A digital wallet, such as a hybrid multisignature digital wallet, may enable a licensed custodian or designee to provide signatures or keys required to approve a digital transaction. The custodian may approve transfers of tokens on digital exchange platforms such as blockchain platforms. A set of custodian signatures, potentially from multiple custodians, may be required to approve a transaction. Alternatively, the hybrid multisignature wallet may be configured in a one-of-many or a one-of-one setup, requiring only a single signature of one or more valid signatures from one or more custodians to approve the transaction. If a network allows a designated party to be a custodian, that party may enter into an agreement at a protocol level on the network to become a designated custodian. The hybrid multisignature wallet may be implemented in support of compliance operations. The custodian may facilitate recovery or replacement of lost signatures or keys, or of entire lost wallets.

The hybrid multisignature wallet may enable transactions such as token swaps and may facilitate transfer of tokens across multiple networks. Individual networks of the multiple networks may implement rigorous or lenient constraints upon transactions performed within the respective networks. Thus, a disparity may exist between two networks involved in a token transfer. The custodian may facilitate management of such a disparity. The custodian may perform functions characteristic of an automated escrow service in conjunction with a digital exchange platform.

Identity and Permissioning

According to principles of the present disclosure, identity and permissioning are treated as a layer placed on top of existing public blockchains. Rather than permissioning at the point of entry to a blockchain, embodiments of the present disclosure improve scalability and security by configuring individual applications running on the blockchain (including, e.g., coalitions of applications) to permission transactions, while also allowing a controlled interaction between different permissioned subsets of the blockchain—including, but not limited to, interacting with un-permissioned applications in a managed way. The result provides the security and access/policy control of a private blockchain, with the liquidity access of a public blockchain.

Moreover, the notion of user identity can be flexible and graded—identity can be defined to include, e.g., blockchain identity (such as wallet address and/or past transaction history, among other examples), simple identification, e.g., email or short message service (SMS) verification, full-KYC verification of government documents, etc. These identity layers can be combined within the context of a single wallet, so a user can seamlessly move from a permissionless setting to one with a more limited identity verification. Furthermore, new layers of stronger identity verification can be added as required to enable the user's application choices. This identity management is implemented by embodiments using a technology known as Decentralized Private Credentials (DPC).

Zero-Knowledge Policy Enforcement

Identity alone may not always be sufficient to build compliant and private applications. Accomplishing this requires the ability to enforce policies regarding which users can access specific applications and how they can access those services. These policies do more than simply control access for individual users, they effectively create virtual permissioned blockchains, i.e., subsets of public blockchains in which different rules of engagement are enforced, and they also permit a flow of liquidity between these areas.

Policies in this setting represent components or modules (like smart contracts) that dictate when a transaction may be completed. These policies can make their decisions using a variety of inputs that are available at transaction time, including but not limited to, for instance, information about an identity of a user (drawn from, e.g., the user's decentralized private (DPC) credential), information about a counterparty's identity, past transaction history, and/or additional external data, such as oracle inputs.

Most critically, policies may be enforced using zero-knowledge proofs. This means that while inputs to a policy evaluation component or module may include sensitive data such as the user's personal identifiable information (PII) or transaction history, this information does not need to be shared with either a blockchain or a counterparty. The only information revealed on the blockchain by a zero-knowledge proof is that some piece of information relating to that user is valid to a high degree of certainty. For example, a policy enforcement utilizing zero-knowledge proofs may ask the user to perform a series of actions which could only be performed correctly if the user knows the underlying information. If the prover does not know the information, they will eventually be proven wrong, and will not be granted access. (Sec, e.g., Chainlink, "Zero-Knowledge Proofs (ZKP)," published online 21 Jul. 2021, the entire teachings of which are incorporated herein by reference.) Moreover, policy proofs can enforce a requirement that specific data is attached to the transaction. For example, a transaction policy may require that encrypted details of the transaction (such as user identity, amount, destination, etc.) are encrypted to a third party for use in later investigation, or that aggregate statistics about overall transactions can be collected for later use.

Policies can be applied to, e.g., individual wallets and/or decentralized apps, or they can be applied to assets and/or collections of users. Applying a policy to a subset of users can create a virtual blockchain of users who can transact with each other according to the policy rules, while transactions outside of the virtual blockchain can be enabled only through explicit policy exceptions.

Transaction Privacy

On conventional public blockchains, information about users' transaction patterns may be leaked. While currently used for compliance, this information can also be useful to miners or counterparties to understand positioning; moreover, it reveals sensitive information when transactions involve, for example, medical practices, and is generally undesirable.

The system and method according to the present disclosure can provide strong transaction privacy while also enforcing policy. A zero-knowledge transaction architecture may be provided to enable users to transfer value in arbitrary amounts between individual recipients, while preserving privacy of a sender and recipient, as well as a transaction amount. The privacy provided can be configured to enable users to selectively reveal information to counterparties, compliance providers, and/or other parties. Moreover, this selective disclosure can be enforced by a policy. According to some embodiments, the policy can be configured to provide full privacy for small-value transactions (e.g., enabling a cash-like experience), while also providing full compliance with financial regulations and selectively reducing privacy for larger amounts.

Privacy-Preserving User Discovery

Enabling payments and transactions requires the ability to discover counterparties. Conventionally, this may be accomplished by non-human-memorable wallet addresses that must be conveyed and carefully entered into a sender's wallet software. This approach also differs from that conventional commercial payment applications, in which user discovery is accomplished with human-memorable phone numbers and user handles.

Discovery poses a challenge in a decentralized payment system. It requires that a system be able to register and manage identities in a setting in which a network is operated by staked nodes, which may come and go. Moreover, it must be enabled in a manner that preserves privacy, so necessary ID lookups are not leaked to the full network.

The system and method according to the present disclosure can provide identity discovery. A user may first establish an identity on a network by constructing a decentralized private credential (DPC) credential that verifies their identity (e.g., based on a phone number, an email address, etc.). These identifiers may be deduplicated and verified by the network, to ensure that there are no conflicts about ownership of an identity. Once identities are established, the network may operate a privacy-preserving identity lookup system, for example based on Private Set Intersection (PSI) technology, thereby making it possible for individuals to issue transactions to an appropriate destination. In an extension of this approach, transactions can be issued in "escrow" to identities that have not been registered yet; for instance, users who register an appropriate identifier may be able to claim an available transactions.

Networks and systems described herein may be configured to operate with, or as part of, a compliance system that is configured to manage transactions over a digital asset network, for example as described in WO 2022/159854 and/or WO 2022/182706, the full contents of each of which are incorporated herein by reference.

Moreover, it will be appreciated that operations described herein may be carried out in any suitable fashion which may be apparent to one having skill in the art, some of which may be described, e.g., in Bowe, et al., "Zexe: Enabling Decentralized Private Computation," published in the Cryptology ePrint Archive, Paper 2018/962 and/or in Kaptchuk, et al., "Giving State to the Stateless: Augmenting Trustworthy Computation with Ledgers," published in the Cryptology ePrint Archive, Paper 2017/201, both of which are incorporated herein by reference.

FIG. 1 illustrates an example embodiment of a system 100 including a privacy network 101. As shown in FIG. 1, in addition to the privacy network 101, the system 100 one or more ID provider(s) 102a-b, one or more Layer 1 (L1) blockchain(s) 103a-c, and one or more digital wallet(s) 104a-b. In an embodiment, each of the digital wallet(s) 104a-b may include respective SDK(s) (software development kits) 105a-b. According to another embodiment, the privacy network 201 may include one or more component(s) or module(s) such as discovery module 106a, identity module 106b, privacy module 106c, and/or policy module 106d, etc., among other examples. Each ID provider 102a-b establishes an identity on the network 101 by constructing a DPC that verifies their identity. Wallet addresses 104a-b are discoverable via a human memorable wallet address, such as a phone number.

The example embodiment in FIG. 1 may permission transactions on a public blockchain privacy network having multiple nodes. The nodes of the blockchain network may have multiple nodes, and the nodes may have a computer processor configured to execute a policy enforcement computing system. The policy enforcement computing system may use a compliance zero-knowledge proof and enforce compliance of a private transaction on a public blockchain network with a predefined policy. The policy enforcement computing system may also control a user identity by issuing a decentralized private credential (DPC) to a verified user. Identity assertions associated with a verified user may be integrated into the decentralized private credential, and a verification zero-knowledge proof may verify the identity assertion. The policy enforcement system may be verified on a compliance layer of a blockchain, which may be implemented on a trusted platform module, a hardware security module, an oracle, or a virtual machine.

According to the present disclosure, with reference to FIG. 1, the privacy network 101 may be a decentralized proof-of-stake based privacy network of validators. The privacy network 101 and/or module(s) 106a-d may be configured to, inter alia, manage user identity, conduct private transactions, and/or settle to multiple L1 blockchains, e.g., L1 blockchain(s) 103a-c. The privacy network 101 may use a zero knowledge (ZK)-friendly consensus architecture, thereby enabling transactions conducted thereon and a state of the privacy network 201 to be shared with other networks (such as Ethereum Virtual Machine (EVM)-compatible networks or other suitable known networks), for example in the form of zkSNARK (zero-knowledge succinct non-interactive argument of knowledge) proofs.

Continuing with FIG. 1, in an embodiment, the privacy network 101 and/or module(s) 106a-d may be configured to use an optimistic rollup-based approach to enable high transaction throughput. For example, the privacy network 101 and/or module(s) 106a-d may jointly compute a large number of transactions and summarize these transactions in a succinct block to be signed by a quorum of validators. Once signed, the block can be stored on one or more L1 blockchain(s), e.g., L1 blockchain(s) 103a-c. A failure in block construction can be registered by submitting a fraud proof demonstrating that some transaction in the set has been improperly computed.

Referring to an embodiment of FIG. 1, an example technical advantage of using such an optimistic approach is that computing power required from the privacy network 101 may be substantially reduced, enabling a truly decentralized network that allows a high transaction rate without requiring complex recursive-zkSNARK capability or powerful (e.g., centralized) proving capability.

Fast Zero-Knowledge Transaction Verification

In an embodiment, a privacy network, e.g., privacy network 101 (FIG. 1), may provide fast and cost-efficient verification of zero-knowledge (e.g., zkSNARK) transactions. Users of the privacy network may benefit from this, as verifying these transactions is a bottleneck in deploying ZK-based applications on L1 network(s), e.g., L1 blockchain(s) 103a-c (FIG. 1).

The privacy network's optimistic approach to ZK verification may allow it to verify transactions submitted directly thereto, and to verify transactions submitted directly to linked L1(s), substantially reducing a gas cost of these transactions. In the latter case, the privacy network may serve as an optimistic ZK verifier—allowing expensive L1 networks to support ZK transactions with the reduced gas costs (provided that users are willing to accept a delay in transaction verification).

Interoperable Network Routing and Multi-Chain Optimistic Bridging

In another embodiment, a privacy network, e.g., privacy network 101 (FIG. 1), may be configured to settle to multiple L1 base networks, e.g., L1 blockchain(s) 103*a-c* (FIG. 1), thereby effectively allowing it to bridge liquidity between different base L1s. From a user's perspective, the privacy network may act as a primary gateway for accessing multiple L1 networks. Rather than submitting directly to L1 networks, users can submit transactions to the privacy network, benefitting from low transaction costs and privacy. From a user's perspective, the privacy network allows direct interoperability of many other networks without the need for a centralized operator, such as a centralized finance (CeFi) exchange.

ZK-Friendly Transaction Format

Further, in yet another embodiment, a privacy network, e.g., privacy network 101 (FIG. 1), may use a ZK-native transaction format, thereby allowing users to summarize transactions conducted on the privacy network using a zkSNARK. These zkSNARKs may also be used to make claims about operations on other networks not directly interoperating with the privacy network, for example, centralized Web2 services and other suitable known services.

Native Identity and Privacy

In an embodiment, a privacy network, e.g., privacy network 101 (FIG. 1), may be configured to manage user identities, for example using DPCs. DPCs are user identities that are managed on-chain by validators, e.g., of privacy network 101. A user may develop their own identity in an accretive manner, e.g., by adding individual identity assertions over time, and then use this identity to access applications on the privacy network and/or on associated L1 chains, e.g., L1 blockchain(s) 103*a-c* (FIG. 1). These unified identity capabilities may be used to facilitate commercial payments and/or regulatory-compliant applications.

Discoverability

According to another embodiment, a privacy network, e.g., privacy network 101 (FIG. 1), may operate a distributed user discoverability network in combination with identity management for access to applications. The discoverability network may rely on PSI and/or Multi-party Computation (MPC) technologies to map human-readable identity "handles" (e.g., phone numbers, email addresses, etc.) to wallet addresses. The privacy network may be configured to allow this information to be stored in a decentralized fashion so that no single validator, e.g., of privacy network 101, has access to private identity information. Requests may be mapped through the privacy network in a manner that preserves user privacy, while making payments and/or user interaction seamless.

Decentralized Private Credentials (DPC): Accretive Identity

In yet another embodiment, as mentioned, a privacy network, e.g., privacy network 201 (FIG. 1), may be configured to manage user identity. According to principles of the present disclosure, the term user identity is used broadly, and should not be construed as being limited to one form of identification, for example, to traditional government identity documents. The privacy network may be configured to record each identity using DPC, i.e., an accretive and nontransferable record that belongs to a single user. A DPC may include a set of assertions about the user's nature. These assertions may include, but are not limited to, proofs-of-ownership of specific wallets (e.g., on various networks), verified ownership of an email address and/or a phone number (e.g., as asserted by a validator committee), full government-ID-verified KYC assertions made by trusted Identity Providers, e.g., ID provider(s) 102*a-b* (FIG. 1), etc.

DPCs may be characterized by the following, thereby making them scalable and suitable for private use:

a) Privacy: Assertions do not necessarily reveal information about the user's identity to a public network. Information such as wallet addresses and/or private phone numbers may be stored on-chain in an encrypted/committed form, so that only the user (and selected counterparties) is able to access this information.

b) Scalability and portability: DPCs may be specifically designed to allow the user to prove identity statements using an efficient zkSNARK-based zero-knowledge proof. These proofs are succinct and significantly smaller than any network token. Moreover, they can be used directly by counterparties compatible with the privacy network and can be exported to other L1 networks, e.g., L1 blockchain(s) 103*a-c* (FIG. 1), directly.

Accordingly, the privacy network may be configured to provide a cross-network system for building and proving identity, which can be used on external decentralized or centralized systems. Identity verification does not reveal private information about an owner—except for information that the owner wishes to selectively reveal. Moreover, this approach removes the need for fully centralized identity managers: while an identity may include assertions made by centralized parties (such as KYC verification companies), these assertions can be combined and managed into a holistic user identity that is more than the sum of its parts.

Details of DPC Creation and Management

In an embodiment, DPCs may be managed by a user and can only be updated or managed with the owner's consent. In practice, DPC usage may include three operations: (i) new credential creation; (ii) addition of new identity assertions; and (iii) identity verification/proving.

The first action can be conducted by the credential owner, while the second can be conducted by any asserting party, simply by issuing a translation on a privacy network, e.g., privacy network 101 (FIG. 1). The final phase can only be conducted by the credential owner and allows the owner to prove the existence (or nonexistence) of any identity assertion.

Policy Enforcement

According to another embodiment, a privacy network, e.g., privacy network 101 (FIG. 1), may include a policy enforcement computing system, e.g., policy system 106*d* (FIG. 1), that manages transactions. Each transaction may be required to comply with one or more programmable policies that determine whether the transaction is compliant. These policies may be enforced using zero-knowledge proofs, thereby allowing policy enforcement to occur without the need for the policy enforcement computing system to publicly reveal private information related to the transaction (such as amount, recipient, sender, user PII, etc.) beyond the fact that a transaction took place.

Nature and Capabilities of Policies

Further, in yet another embodiment, a privacy network, e.g., privacy network 101 (FIG. 1), may provide a flexible basis for enforcing policies on a customer's counterparties and/or holders and users of an asset. Policies may be quite complex, e.g., requiring different levels of identity attestation depending on transaction amount, or requiring disclosure of tax ID information to authorities for large and/or suspicious transactions. At the same time evaluation is privacy preserving.

A policy enforcement computing system, e.g., policy system, 106*d* (FIG. 1), may be configured to process any information in a certificate or transaction, as well as separately maintained state, even cross-chain. This enables application of anti-structuring or daily limits, different rules for cross-border transactions, and/or a high level of compliance. It is deeply reconfigurable, letting users solve their compliance needs.

Each policy in the privacy network may include a programmable zero-knowledge smart contract that reasons over (processes) the transaction data, sender and receiver identity, and other information such as asset type. In addition to these features, policies may be further configured to enforce the inclusion of verifiably encrypted data within transactions that are placed on a blockchain. This verifiable encryption allows policies to store relevant information in a form that only selected parties can read, e.g., by storing sender information in an encrypted field that can be accessed by a designated compliance department.

The privacy network may be configured to allow individual senders and/or recipients to opt into policy enforcement, thereby allowing specific parties to enforce requirements such as transaction limits, and/or to require KYC/identity attestations for access to specific DeFi services. Policies can also be associated with specific assets, ensuring that each asset specifies a particular set of limits regarding transaction amount and privacy/compliance capability. Policies can also specify the interaction of different assets, e.g., controlling the flow of funds from a compliant asset into an un-permissioned one. This enables interaction between permissioned applications and open decentralized assets/applications.

Privacy Guarantees

In an embodiment, a privacy network, e.g., privacy network 101 (FIG. 1), may be configured to use a dedicated domain-specific language for specifying policy requirements. The language may allow individual applications and asset issuers to write policies and deploy them on the privacy network in a permissionless way. When a user interacts with a policy-enabled asset or application, they will be informed of the implications of satisfying the policy. For example, policies that require the user to provide and encrypt PII may require user consent; the policy language may define how to determine precisely what the privacy implications of policy compliance are, and present this to the user at the time of a transaction.

Because a policy enforcement computing system, e.g., policy system 106*d* (FIG. 1), may use zero-knowledge proof technology, the privacy of the information reasoned over along with the exact policy applied is preserved. This permits users to remain in control of how their private data is used.

Transaction Privacy

According to another embodiment, a privacy network's, e.g., privacy network 101 (FIG. 1), rollup-based design may allow for the settlement of transactions to multiple base L1s, e.g., L1 blockchain(s) 103*a-c* (FIG. 1). Because relatively few L1s may include native transaction-privacy capabilities, the privacy network may function to provide efficient transaction privacy for use on the privacy network, as well as for applications running on connected L1 chains. The privacy network may be configured to implement transaction privacy using an unspent transaction output (UTXO)-based payment privacy layer derived from zkSNARK proofs. This layer may focus primarily on the transfer of value between accounts, enabling users to access (nonprivate) DeFi systems using private transfers of funds. Within the privacy layer, each transaction may hide a sender, receiver, and/or amount of the transaction. However, this layer can be combined with a policy layer (e.g., as described below), which may facilitate specifying different selective-privacy policies. For example, transaction details can be revealed to the receiver or encrypted on-chain for access by third parties.

Combining Policy and Privacy

Further, in yet another embodiment, a privacy network, e.g., privacy network 101 (FIG. 1), may be configured to facilitate complex policy enforcement using zero-knowledge, for example by combining a policy enforcement computing system, e.g., policy system 106*d* (FIG. 1), with a transaction privacy system. Accordingly, different currencies can be organized into "sealed pools" in which user and pool-wide policies are enforced. These policies may perform, inter alia, one or more of the following nonlimiting example tasks:

a) Ensuring that each user has a DPC identity of a sufficient grade for transacting in a sealed pool.

b) Placing limitations on transaction amounts (and overall transfer-over-time amounts per identity) according to identity quality, e.g., users with limited ID verification may only be able to transact smaller amounts, while users with full KYC can make transactions of arbitrary size.

c) Enabling investigatory capability as a user opt-in. When users acquiesce, the privacy network can record encrypted information about each transaction, stored under one or more key(s) controlled by the privacy network. This information may be required for transactions meeting specific characteristics, such as high transaction amounts, among other examples. The exact conditions for accessing this investigatory information may be controlled by a policy and addressed to a specific coalition of trusted parties responsible for managing this user data. Decryption capability can also be managed through auditability features described further below, in order to prevent unauthorized access or abuse of this feature.

Privacy-Preserving User Discovery

In an embodiment, a privacy network, e.g., privacy network 201 (FIG. 1), may include a DPC system, thereby providing for a safe discovery experience. According to some example embodiments, MPC identity providers may expose only desired attributes to search, and then allow other clients to discover underlying blockchain addresses to effect transfers. The degree of privacy and which specific fields are exposed may be determined by an identity provider, e.g., ID provider(s) 102*a-b* (FIG. 1), as may be policies around who can search. This search may be independent of the underlying blockchains powering the transactions.

Applications of discovery may include, but are not limited to, consolidating user information, providing rich socially enhanced payment experiences, mapping user friendly information to payment credentials, and enabling payments to a real-world identity.

Figure 2:
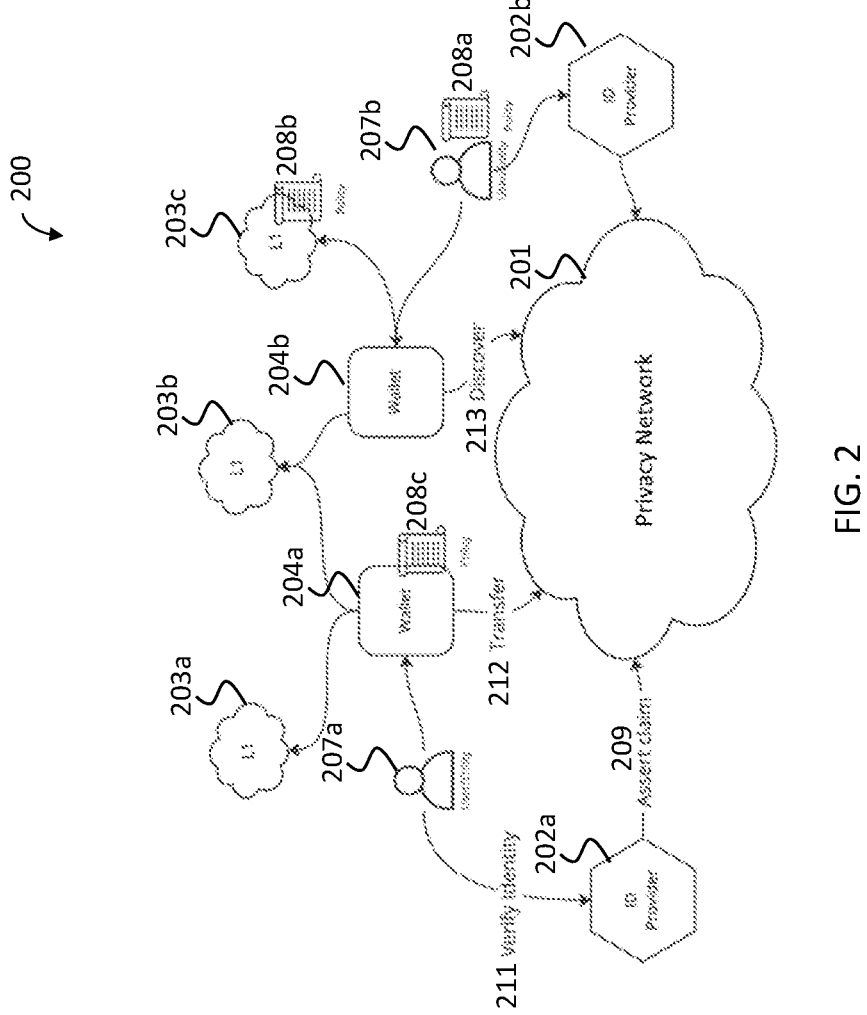
FIG. 2 illustrates an example embodiment of a system with Layer 1 (L1) and Layer 2 (L2) blockchain compatibility and cross-chain capability.

FIG. 2 illustrates an example embodiment of a system 200 with L1 and Layer 2 (L2) blockchain compatibility and cross-chain capability. As shown in FIG. 2, the system 200 includes a privacy network 201, one or more ID provider(s) 202*a-b*, one or more L1 blockchain(s) 203*a-c*, one or more digital wallet(s) 204*a-b*, and one or more user(s)/entity(ies) 207*a-b*. In an embodiment, the ID provider(s) 202*a-b* may assert claims 209 to the privacy network 201. According to another embodiment, the user(s) 204*a-b* may verify an identity 211 via the ID provider(s) 202*a-b*. Further, in yet another embodiment, digital wallet(s) 204*a-b* may carry out transfer(s) 312 via and/or transmit discovery request(s) 213 to the privacy network 201. In some embodiments, a policy, e.g., policy 208*a*, may be held by a user, e.g., user 207*b*; in other embodiments, a policy, e.g., policy 208*b*, may be held by a digital wallet, e.g., wallet 204*a*; further, in yet other embodiments, a policy, e.g., policy 208*c*, may be held by a L1 blockchain, e.g., L1 blockchain 203*c*. According to other embodiments, policy(ies) 208*a-c* may be smart contracts, e.g., programmable zero-knowledge smart contracts.

Figure 3:
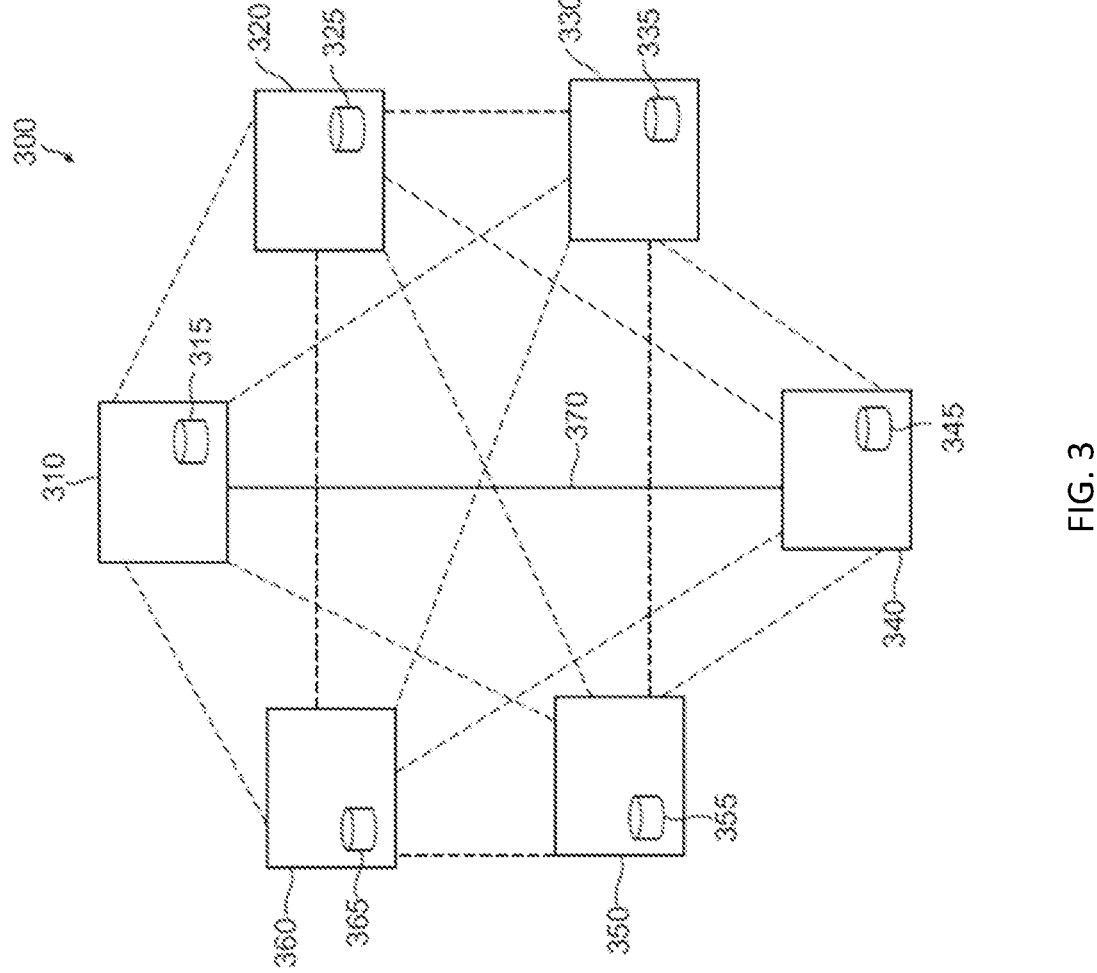
FIG. 3 is a simplified block diagram of an example embodiment of a distributed blockchain ledger computer-implemented system.

FIG. 3 is a simplified block diagram of an example embodiment of a blockchain network 300, also referred to interchangeably herein as a distributed ledger network 300, that may be accessed according to an example embodiment. The blockchain network 300 may be employed as L1 blockchain(s) 103*a-c* of FIG. 1 and/or L1 blockchain(s) 203*a-c* of FIG. 2, described hereinabove. The blockchain network 300 is a distributed ledger peer-to-peer (P2P) network and is valuable because this network enables trustworthy processing and recording of transactions without the need to fully trust any user (e.g., person, entity, program, and the like) involved in the transactions, reducing the need for trusted intermediaries to facilitate the transaction. Existing applications use the distributed ledger network 300 to transfer and record, in the form of blockchain based records, movement of tokens. Such blockchain based records form a cryptographically secured backlinked list of blocks.

The distributed ledger network 300 includes multiple computing devices configured as nodes 310, 320, 330, 340, 350, 360 of the distributed ledger network 300. Each node 310, 320, 330, 340, 350, 360 locally stores and maintains a respective identical copy 315, 325, 335, 345, 355, 365 of the blockchain ledger in memory communicatively coupled to the node. The nodes exchange messages within the distributed ledger network 300 to update and synchronize the ledger stored and maintained by each node. The nodes may also execute decentralized applications (decentralized apps or "dApps"), such as via smart contracts, for processing the messages. An example message transmission 370 from node 310 to node 340 may be used to exchange a token in the distributed ledger network 300 as shown in FIG. 3. Dotted lines between each set of nodes in the distributed ledger network 300 indicate similar transmissions that may be exchanged between any other set of nodes in the distributed ledger network 300. The messages may include a confirmed transfer for recording data associated with a token being transferred, a blockchain public key for each of one or more parties participating in the transfer.

Referring back to FIGS. 1 and 2, according to an example embodiment, L1 blockchain(s) 103*a-c* and/or L1 blockchain(s) 203*a-c* may be Ethereum network(s); however, it should be understood that L1 blockchain(s) 103*a-c* and/or other L1 blockchain(s) 203*a-c* may be any suitable known blockchain network(s). Ethereum is a decentralized network of computers with two basic functions: (i) a blockchain that can record transactions and (ii) a virtual machine (VM), that is, an Ethereum Virtual Machine (EVM), that can produce smart contracts. Because of these two functions, Ethereum is able to support decentralized applications (dApps). These dApps are built on the existing Ethereum blockchain, piggybacking off its underlying technology. In return, Ethereum charges developers for computing power in its network, which can only be paid in Ether, the only inter-platform currency. Depending on its purpose, a dApp may create ERC-20 (Ethereum Request for Comments 20) tokens to function as a currency. According to an example embodiment, fungible tokens (FTs) disclosed herein may be ERC-20 tokens or any other suitable FT known to those of skill in the art.

The code of the smart contract may be uploaded on the EVM, that may be a universal runtime compiler or browser, to execute the smart contract's code. Once the code is on the EVM, the code may be the same across each Ethereum node to be run to check whether conditions are met, such as a condition for the balance reaching the trade value prior to expiration of the expiration term.

Ethereum has a long history of developed standards. For example, ERC-20 is a standard that defines a set of six functions that other smart contracts within the Ethereum ecosystem can understand and recognize. ERC-20 is a protocol standard and to be compliant with ERC-20, the functions need to be included in a token's smart contract. ERC-20 outlines a specific list of rules that a given Ethereum-based token must deploy, simplifying a process of programming the functions of tokens on Ethereum's blockchain. These include, for instance, how to transfer a token (by an owner or on behalf of the owner), such as may be employed for transferring fungible tokens (FTs) of a buyer, and how to access data (e.g., name, symbol, supply, balance, etc.) concerning the token, such as a value of a digital asset in digital wallet(s) 104*a-b* (FIG. 1) and/or digital wallet(s) 204*a-b* (FIG. 2).

Figure 4:
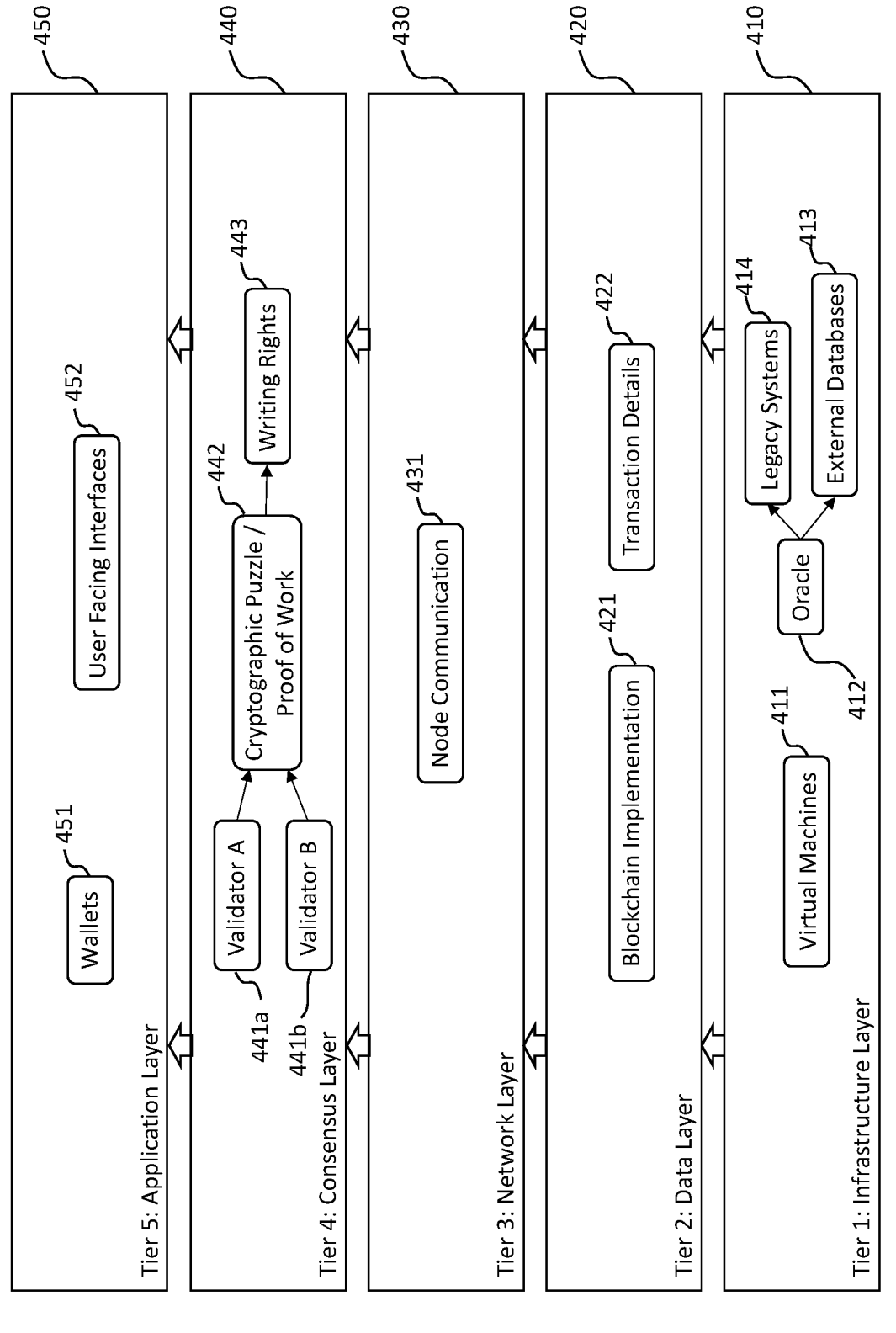
FIG. 4 is a simplified block diagram showing exemplary blockchain layers according to an embodiment.

FIG. 4 is a simplified block diagram showing exemplary blockchain layers 400 according to an embodiment. Blockchain layers 400 may include infrastructure (tier 1) layer 410, data (tier 2) layer 420, network (tier 3) layer 430, consensus (tier 4) layer 440, and application (tier 5) layer 450. The infrastructure layer 410 may be a hardware layer and may include one or more virtual machines (VMs) 411 and/or one or more oracles 412. A virtual machine (VM) 411 may provide a runtime environment for transaction execution in the blockchain. In an embodiment, a VM 411 may be, for example, stack-based and may enable untrusted code to be executed by a global peer-to-peer (P2P) network of computers. An oracle 412 may provide a third-party service that connects smart contracts executing on the blockchain with off-chain data sources. For example, an oracle 412 may query, verify, and/or authenticate one or more external data sources for the system 100 (FIG. 1) and/or system 200 (FIG. 2). According to an embodiment, external data sources may include, e.g., one or more legacy systems 414 and/or one or more external compliance systems and/or databases 413.

According to an embodiment, an oracle node architecture, e.g., oracle 412, may be provided to serve machine learning (ML) models for smart contracts on a blockchain, e.g., programmable zero-knowledge smart contracts 208*a-c* (FIG. 2). Example smart contract technology may be implemented by Web3 blockchain systems, such as Ethereum, Cardano, Solana, BNB Smart Chain, Casper, Kaleido, and Fantom.

The oracle architecture may be referred to as a "ML oracle." The ML oracle is useful to smart contract developers who want to incorporate ML models into their smart contracts. For example, a smart contract may distribute funds based on an algorithm, and the algorithm may include a ML model that forecasts sales of a product for a given week. The smart contract may invoke an inference call to a model on the ML oracle to obtain the forecast. As a further example, there are generative arts where the generative ML model may be an integral part of an artwork. Interaction with the model to generate new images may be part of a viewing experience. One well-known ML model type used by generative art is a generative adversarial network (GAN). Using the ML oracle, the ML model may become part of an NFT, thereby enabling an interactive viewing experience.

To summarize, in an embodiment, a smart contract may request an inference call to a ML model by identifying an ML model to call, such as by providing a hash value, and an input to the model. According to one such embodiment, a model file may be uploaded to, e.g., IPFS (InterPlanetary File System) or any other suitable known storage system, by a dApp developer and a model server may download the model file, e.g., using the hash value. For the ML model server to be generic enough to serve a wide range of models, it may also take as an input parameter a model type, e.g., PyTorch, TensorFlow, scikit-learn, or any other suitable known model type, as well as an input and output specification. The input may be data directly received from the calling smart contract, or it may be received indirectly via, e.g., an IPFS Uniform Resource Identifier (URI) or any other suitable identifier known to those of skill in the art. Similarly, the output may be sent back to the smart contract, or it may be uploaded to any suitable known storage system, including, but not limited to IPFS, and the, e.g., URI, may be sent to the smart contract. For example, a forecasting model may use the direct input/output method. An indirect input/output method employing a known storage system such as IPFS may be commonly used by computer vision/imaging models, among other examples.

In an example embodiment, the system 100 and/or 200 may include a virtual machine (VM), e.g., VM 411, with a blockchain oracle, e.g., oracle 412.

Continuing with FIG. 4, data layer 420 may interface with infrastructure layer 410 and may include blockchain implementation 421 and transaction details 422. A blockchain is a decentralized, massively replicated database (distributed ledger), where transactions are arranged in blocks, and placed in a P2P network. The blockchain implementation 421 may include a data structure represented, for example, as a linked list of blocks, where transactions are ordered. The blockchain implementation 421's data structure may include two primary components—pointers and a linked list. Pointers are variables that refer to a location of another variable, and a linked list is a list of chained blocks, where each block has data and pointers to the previous block. Each block may contain a list of transactions that happened since a prior block. Transaction details 422 may contain information about transactions occurring on the blockchain.

The network layer 430 may interface with data layer 420 and may also be referred to as a P2P layer or propagation layer. One purpose of network layer 430 may be to facilitate node communication 431, such that nodes can discover each other and can communicate, propagate, and synchronize with each other to maintain a valid current state of the blockchain. A distributed P2P network, e.g., network layer 430, may be a computer network in which nodes are distributed and share the workload of the network to achieve a common purpose. Nodes in network layer 430 may carry out the blockchain's transactions.

The consensus layer 440 may interface with network layer 430 and may ensure that blocks are ordered, validated, and guaranteed to be in the correct sequence. A set of agreements between nodes in a distributed P2P network may be established by the consensus layer 440. The agreements result in consensus protocols or algorithms, which correspond to rules that nodes follow in order to validate transactions and create blocks in accordance with those rules. To validate a transaction, a validator, e.g., validator 441a or validator 441b, may perform a consensus algorithm, such as proof of work 442 or any other suitable algorithm known in the art. Performing the consensus algorithm may involve expending computational resources to solve a cryptographic puzzle 442. After being validated according to a consensus algorithm, a transaction may be written to the blockchain through a process of writing rights 443.

The application layer 450 may interface with consensus layer 440 and may include customized applications and services, such as electronic wallets 451. Further, application layer 450 may include (not shown): smart contracts, chaincode, and decentralized apps (dApps). The application layer 450 may also include applications utilized by end users to interact with the blockchain. Such applications may be, e.g., one or more user facing interfaces 452. Further, such applications may include, for example (not shown): scripts, application programming interfaces (APIs), and frameworks.

Figure 5:
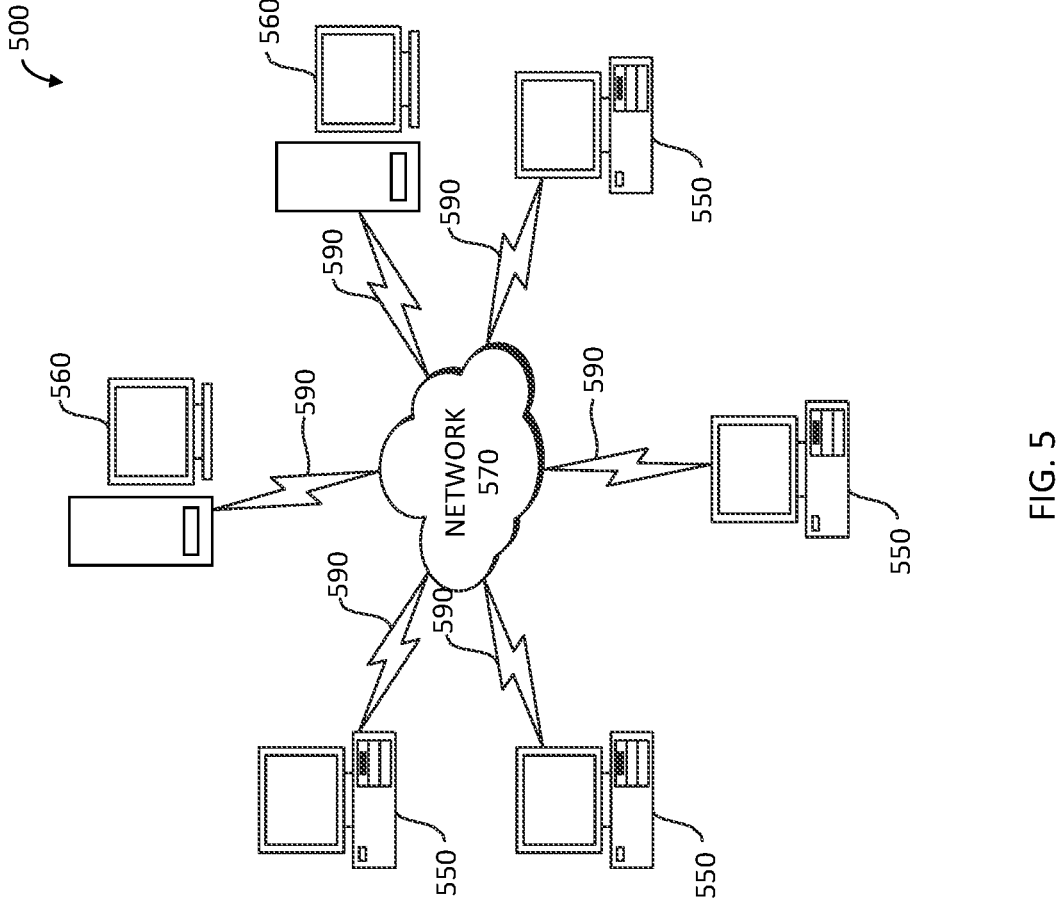
FIG. 5 is a simplified block diagram of an example implementation of a network in communication with an embodiment.

An example implementation of system 100 (FIG. 1) and/or system 200 (FIG. 2) may be implemented in a software, firmware, or hardware environment. FIG. 5 illustrates one such example digital processing environment 500 in which embodiments of system 100 and/or system 200 may be implemented. Client computer(s)/device(s) 550 and server computer(s)/device(s) 560 provide processing, storage, and input/output (I/O) devices executing application programs and the like.

Figure 6:
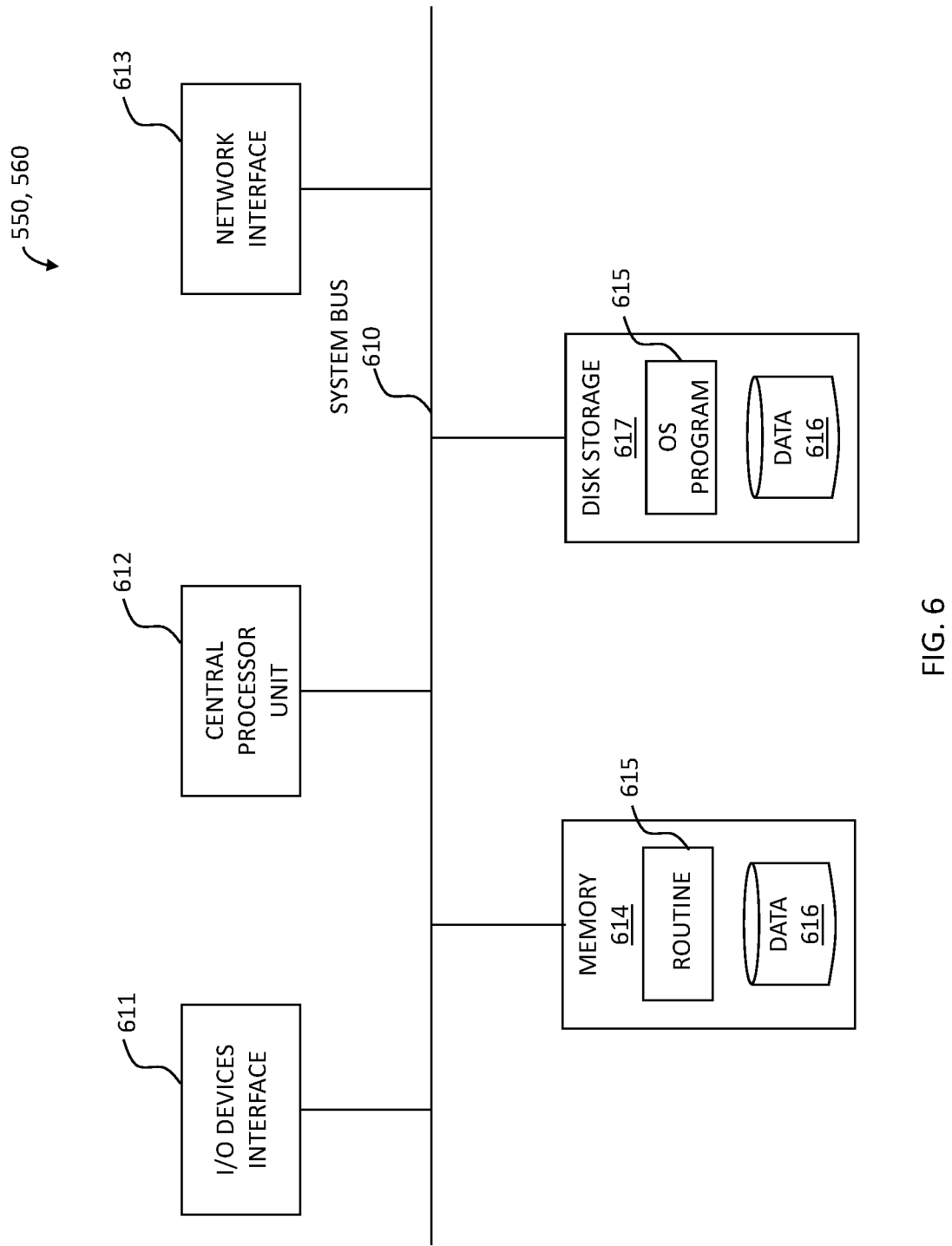
FIG. 6 is a simplified block diagram of any internal structure of a computer/computing node in a processing environment of an embodiment.

Client computer(s)/device(s) 550 may be linked 590 directly or through communications network 570 to other computing devices, including other client computer(s)/device(s) 550 and server computer(s)/device(s) 560. Referring to FIGS. 5 and 6 (the latter described in more detail hereinbelow), network 570 utilizes system 100 and/or system 200 according to an embodiment of the invention, for providing privacy for transfer, e.g., transfer 212 (FIG. 2), of digital assets, e.g., held in digital wallet(s) 104a-b (FIG. 1) and/or digital wallet(s) 204a-b (FIG. 2).

The communication network 570 may be part of a wireless or wired network, a remote access network, a global network (e.g., the Internet), a worldwide collection of computers, local area networks (LANs) or wide area networks (WANs), and gateways, routers, and switches that may use a variety of known protocols (e.g., TCP/IP, Bluetooth®, etc.) to communicate with one another. Communication network 570 may also be a virtual private network (VPN) or an out-of-band (OOB) network or both. Further, communication network 570 may take a variety of forms, including, but not limited to, a blockchain network, a distributed ledger network, a data network, voice network (e.g., landline, mobile, etc.), audio network, video network, satellite network, radio network, and pager network. Other known electronic device/computer network architectures are also suitable. For example, client computer(s)/device(s) 550 may include nodes shown in FIG. 3, which run user applications that enable a user to communicate with an application to determine whether a user meets a work requirement. A blockchain network, such as L1 blockchain network(s) 102a-c (FIG. 1) and/or 202a-c (FIG. 2), may be configured on each user device 310, 320 (FIG. 3) to store tokens. Client computers 350 (FIG. 3) of the computer-implemented system 100 (FIG. 1) and/or 200 (FIG. 2) may be configured with a trusted execution environment (TEE) or trusted platform module (TPM), where the application may be run and digital assets, e.g., held in digital wallet(s) 104*a-b* (FIG. 1) and/or 204*a-b* (FIG. 2), and/or tokens may be stored.

Referring again to FIG. 5, server computer(s)/device(s) 560 of the computer-implemented system may be configured to include a server that that executes the application. For example, the application of server computer(s)/device(s) 560 may determine whether a user has satisfied a work requirement and produce a determination result and pair, in computer memory, e.g., memory 614 (FIG. 6), an indication of the determination result with an identifier of the user or an identifier of a digital asset of the user, such as an address of a node of a blockchain network accessible by the user. The application of server computer(s)/device(s) 560 also facilitates a transfer of a collateral token by moving the collateral token to, for example, a digital wallet, e.g., digital wallet(s) 104*a-b* (FIG. 1) and/or 204*a-b* (FIG. 2), implemented upon a blockchain network. For another example, server computer(s)/device(s) 560 or client computer(s)/device(s) 550 may comprise peer computing devices (nodes) 310, 320, 330, 340, 350, 360 of a distributed blockchain ledger 300 of FIG. 3, which use smart contracts to execute and record transactions implemented via tokens.

FIG. 6 is a block diagram of any internal structure of a computing/processing node (e.g., client computer(s)/device(s) 550 or server computer(s)/device(s) 560) in the processing environment 500 of FIG. 5, which may be used to facilitate displaying audio, image, video, or data signal information. Each computer/device 550, 560 in FIG. 6 may contain a system bus 610, where a bus is a set of actual or virtual hardware lines used for data transfer among components of a computer or processing system. System bus 610 may essentially be a shared conduit that connects different elements of a computer system (e.g., processor, disk storage, memory, I/O ports, etc.), thereby enabling transfer of data between elements or components.

Continuing with FIG. 6, attached to system bus 610 is an I/O device interface 611 for connecting various input and output devices (e.g., keyboard, mouse, touch screen interface, displays, printers, speakers, audio inputs and outputs, video inputs and outputs, microphone jacks, etc.) to a computer/device 550, 560. Network interface 613 may allow a computer/device to connect to various other devices attached to a network, for example network 570 of FIG. 5. Memory 614 may provide volatile storage for computer software instructions 615 and data 616 used in some embodiments to implement software modules/components of system 100 (FIG. 1) and/or system 200 (FIG. 2).

Software components 615, 616 of system 100 and/or 200 (e.g., privacy network 101 (FIG. 1), module(s)/engine(s)/system(s) 106*a-d* (FIG. 1), software components of the privacy network 201 (FIG. 2), the policy enforcement system, a minimax recursive algorithm, encoder/decoder, Trusted Execution Environment (TEE), blockchain Layer 1 virtual machine (VM), oracle, wallet interface, applets, authentication site, cybersecurity controller, service applications, and the like) described herein may be configured using any programming language known in the art, including any high-level, object-oriented programming (OOP) language, such as Python or Solidity. The computer-implemented system may include instances of processes that enable execution of transactions and recordation of transactions. It should be understood that the terms "transaction" and "exchange" are herein used interchangeably, when used within a context of digitally transferring items of value, such as digital assets (e.g., held in digital wallet(s) 104*a-b* of FIGS. 1 and/or 204*a-b* of FIG. 2), collateral assets, and/or collateral tokens, among entities associated with a blockchain network, e.g., L1 blockchain(s) 103*a-c* (FIG. 1) and/or 203*a-c* (FIG. 2). The computer-implemented system 100 and/or 200 may also include instances of a scoring engine and/or encoders/decoders, which can be implemented by, e.g., a server 560 or a client that communicates with the server 560, using, for example, secure sockets layer (SSL), Hypertext Transfer Protocol Secure (HTTPS), or any other suitable protocol known to those of skill in the art.

In an example mobile implementation, a mobile agent implementation of embodiments may be provided. A client-server environment may be used to enable mobile services using a network server, e.g., server 560. It may use, for example, the Extensible Messaging and Presence Protocol (XMPP) protocol, or any other suitable protocol known to those of skill in the art, to tether an engine/agent 615 on a user device 550 to a server 560. The server 560 may then issue commands to the user device on request. The mobile user interface framework to access certain components of computer-implemented system 100 (FIG. 1) and/or 200 (FIG. 2) may be based on, e.g., XHP. Javalin, and/or Wireless Universal Resource FiLe (WURFL), or other suitable known framework(s), interface(s), or combinations thereof. In another example mobile implementation for the iOS operating system (OS) and its corresponding application programming interface (API), the Cocoa Touch API may be used to implement the client-side components 615 using Objective-C or any other suitable known high-level OOP language that adds Smalltalk-style messaging to the C programming language.

Disk storage 617 may provide non-volatile storage for computer software instructions 615 (equivalently "OS program") and data 616 may be used to implement embodiments of system 100 and/or 200. The system may include disk storage accessible to a server computer 560. The server computer may maintain secure access to records associated with system 100 and/or 200. Central processing unit (CPU) 612 may also be attached to system bus 610 and provide for execution of computer instructions. In one example embodiment, the CPU 612 is a secure cryptoprocessor implemented as a dedicated microprocessor configured to execute the compliance enforcement system. The cryptoprocessor may be specialized to execute cryptographic algorithms within hardware to support the compliance enforcement system. Functions include such things as accelerating encryption algorithms that verify compliance of encoded rules related to an NFT asset, enhanced tamper, and intrusion detection, enhanced data, key protection and security enhanced memory access and I/O to facilitate transactions across multiple blockchain systems.

In some embodiments, processor routines 615 and data 616 may be computer program products. For example, aspects of system 100 and/or 200 may include both server-side and client-side components.

In other embodiments, authenticators/attesters may be contacted via, e.g., blockchain gaming systems, instant messaging applications, video conferencing systems, VOIP (voice over IP) systems, etc., all of which may be implemented, at least in part, in software 615, 616. Further, in yet other embodiments, client-side components interfacing with system 100 and/or 200 may be implemented as an application programming interface (API), executable software component, or integrated component of the OS configured to provide access to an electronic wallet on a Trusted Platform Module (TPM) executing on a client device 550.

In an embodiment, software implementations 615, 616 may be implemented as a computer-readable medium capable of being stored on a storage device 617, which provides at least a portion of the software instructions for system 100 and/or 200. Executing instances of respective software components of system 100 and/or 200, such as instances of system 100 and/or 200, may be implemented as computer program products 615, and may be installed by any suitable software installation procedure, as is well known in the art. In another embodiment, at least a portion of the system software instructions 615 may be downloaded over a wired and/or wireless connection via, for example, a browser SSL session or through an app (whether executed from a mobile or other computing device). In other embodiments, system 100 and/or 200 software components 615 may be implemented as a computer program propagated signal product embodied on a propagated signal on a propagation medium (e.g., a radio wave, an infrared wave, a laser wave, a sound wave, or an electrical wave propagated over a global network such as the Internet, or other network(s) known in the art).

In one embodiment, a compliance enforcement system is implemented as an embedded virtual machine (VM), preferably executing on one or more cryptoprocessors configured to support efficient and scalable processing of application-to-blockchain and blockchain-to-blockchain transactions. The cryptoprocessor may be a dedicated computer-on-a-chip or microprocessor for carrying out cryptographic transaction operations, embedded in a hardware security module (HSM) with security measures providing failsafe tamper resistance. The embedded cryptographic processor can be configured to output decrypted data onto a bus in a secure environment, in that embedded cryptoprocessor does not output decrypted data or decrypted program instructions in an environment where security cannot be maintained. The embedded cryptoprocessor does not reveal keys or executable instructions on a bus, except in encrypted form, and zeros keys by attempts at probing or scanning.

In an embodiment, the CPU is as a hybrid CPU/Zero Knowledge Processing Unit (ZPU) and programmable hardware accelerator. In an embodiment, the Zero Knowledge Processing Unit (ZPU) may be an embedded based hardware accelerator optimized to improve blockchain packet processing for verifying blockchain transactions using zkSNARK transaction processing. In an example embodiment, the hybrid CPU/Zero Knowledge Processing Unit (ZPU) with an embedded optimistic Zero Knowledge verifier based hardware accelerator is configured to handle hyperscale cloud workloads of transaction processing including 5G transport processing, and 5G RAN intelligent controller (RIC) & edge inferencing. In one preferred example, the hybrid CPU/Zero Knowledge Processing Unit (ZPU) with an embedded Zero Knowledge verifier based hardware accelerator is configured to deliver low latency and high throughput capacity, making it suitable for deploying a plurality of high-speed blockchain transactions. The architecture may also be configured to include an off-chip High Bandwidth Memory (HBM) to support high memory capacities and high memory bandwidth.

In an embodiment, the hybrid CPU/Zero Knowledge Processing Unit (ZPU) 612 includes an embedded hardware/firmware implementation of the policy computing system, which can spawn multiple executable instances of the Zero Knowledge verifier thereby effectively allowing it to bridge liquidity between different blockchains 103-*a-c* while verifying identity using Decentralized Private Credentials (DPC) for respective users.

Each encapsulated executing instance of the Zero Knowledge verifier is preferably in a container to preserve its integrity. In this way, a spawned instance of the Zero Knowledge verifier and respective libraries and dependencies execute in lightweight executable container that is capable of running consistently and can be optimized as a portable computer unit deployed faster and more securely. Unlike traditional computing methods, by executing the Zero Knowledge verifier in a container, when transferred to a new location, it is more resilient to bugs and errors. Containerization eliminates this problem by binding the application code together with the related configuration files, libraries, and dependencies required for it to run. This container can thereby potentially be abstracted away from the host system and becomes portable—able to run across any platform or cloud, free of issues. In an embodiment, the encapsulated Zero Knowledge verifier may be coupled with the policy system 106*d* and implemented as virtual machine executing from a server in the privacy network 201. In this way, the architecture can provide a cross-network system for building and proving identity in blockchain transactions.

The policy enforcement system may be verified on a compliance layer of a blockchain. At least portions of the policy enforcement system may be implemented on a trusted platform module, a hardware security module, an oracle, or a virtual machine. An example embodiment includes device code executed in a TEE or TPM. A TEE or TPM is a hardware environment that runs instructions and stores data outside a main operating system (OS) of a device. This protects sensitive code and data from malware or snooping with purpose-built hardware governed by an ecosystem of endorsements, beginning with a device manufacturer. The system 100 and/or 200 may perform checks on the TEE or TPM, such as executing BIOS (Basic Input/Output System) checks, to verify that folders (e.g., wallets, such as digital wallet(s) 104*a-b* of FIG. 1 and/or digital wallet(s) 204*a-b* of FIG. 2) stored in the TEE/TPM have not been altered by malicious actors.

Figure 7A:
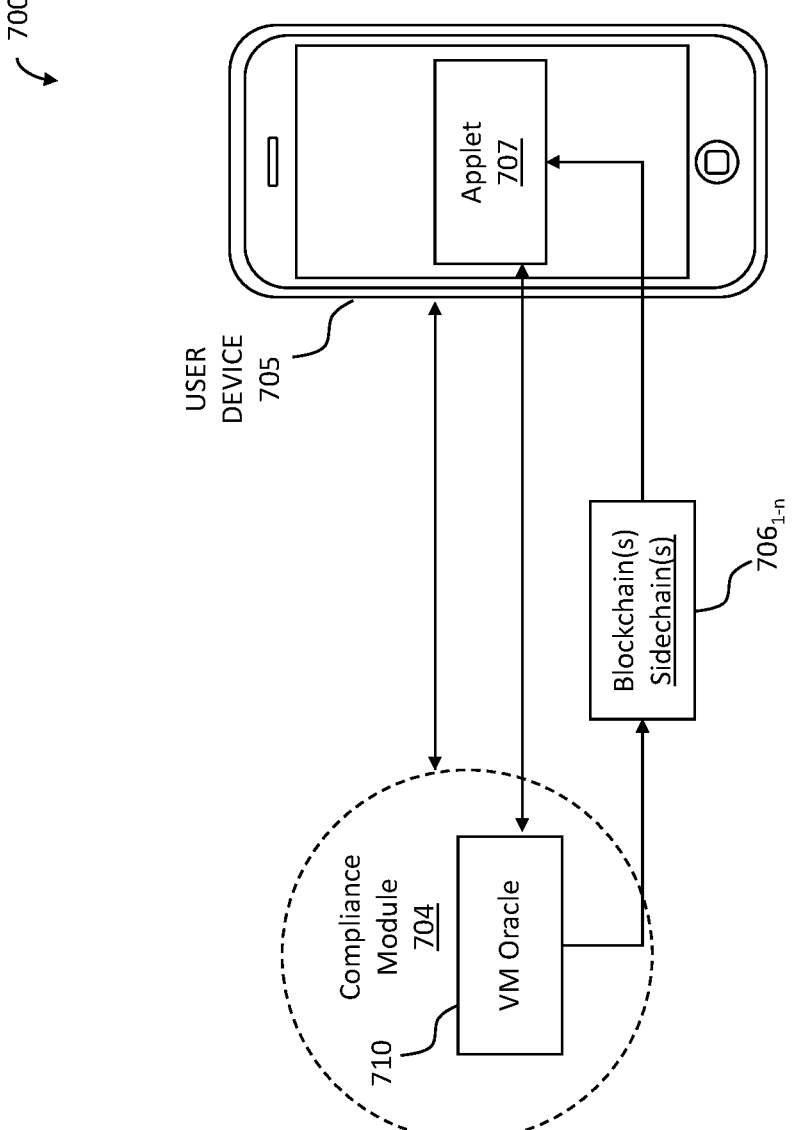
FIG. 7A is a simplified block diagram showing an example device authentication system according to an embodiment.

FIG. 7A is a simplified block diagram showing an example device authentication system 700 with components upon which system 100 (FIG. 1) and/or 200 (FIG. 2) may operate according to an embodiment. With these system components 700, network nodes may make use of hardened encryption and the cryptographic key in endpoint user devices 705 through an API 704*a* to a compliance enforcement system 704. The user devices 705 may provide processing, storage, and input/output devices executing application programs and the like. In addition, further services may be provided built on these system components 700 for device management, backup, attestation, etc. To support system 100 and/or 200, the registration of identity cryptographic keys and a set of device management services for attestation, backup, and device grouping, are managed. The system components 700, e.g., cryptographic key wallet 714, may also interface with applet 709.

It would be the intent of system 700 not to maintain mission critical data as in conventional approaches, but rather to provide a platform for seamless, yet secure, connections between compliance enforcement system 704 and user devices 705. On one end of the system is the VM oracle 710 that prepares an instruction for a user device 705 and at the other is system 700 which is applet 707 that can act on that instruction. A protocol may define how these instructions and replies are constructed.

According to an embodiment, system 700 may illustrate binding between a digital asset and multiple parties/devices. The system 700 may lock features of identity, transaction and attestation to the hardware of respective user devices 705. In one example, the system 700 may provide a zero-knowledge proof attestation that a node implementing the compliance enforcement system minted a collateral token configured to consolidate liquidity within a blockchain protocol for an exchange of a digital asset. In this way, the attestation can improve processing time of a given exchange transaction by allowing the system 700 to approve an exchange if the exchange is performed on or facilitated by the at least one node, thereby ensuring that the exchange is secure and that the compliance enforcement system provides liquidity to support the exchange of the digital asset.

Figure 7B:
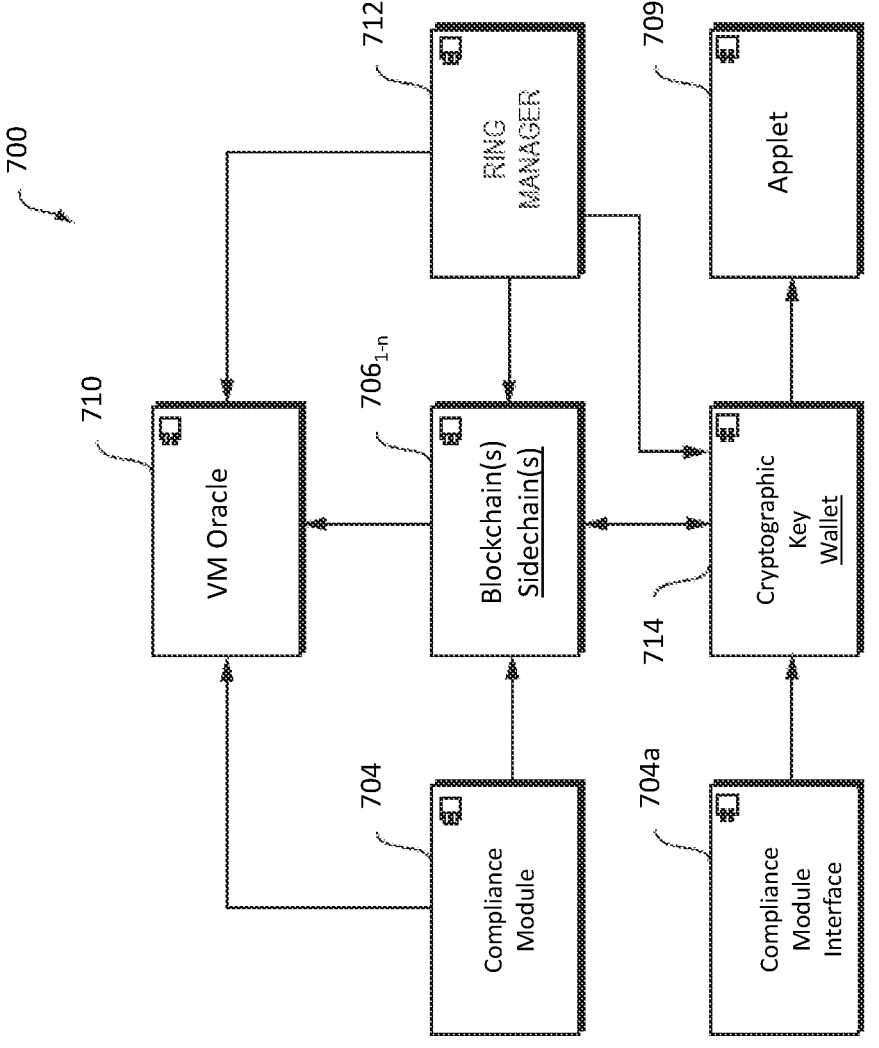
FIG. 7B is a diagram showing example system components for the example device authentication system according to an embodiment.

In an embodiment, system 700, shown in FIG. 7B, may use a secure socket, e.g., SSL or HTTPS, to maintain a persistent connection with devices. This channel may be used for pairing and other administrative attestation functions of the compliance enforcement system. VM oracle 710 may be provided to/utilized on blockchain networks for simplifying the encoding of a transaction. This VM oracle 710, for example, could be implemented in a programming language, such as a high-level, OOP language with dynamic semantics like Python.

A TEE may be implemented in a user device hardware security chip separate execution environment that runs alongside the rich operating system (OS), and provides security services to that rich environment. The cryptographic keys and/or digital assets, collateral assets, or collateral tokens may be stored in the TEE. The TEE offers an execution space that provides a higher level of security than a rich OS. The TEE may be implemented as a virtual machine (VM), on the user devices, or on the network nodes.

A ring manager 712 can be implemented as a service provided to end-users for managing rings (or clusters) to provide scalable execution and cross-chain deployment of compliance enforcement system(s) 704 across multiple blockchain systems. The compliance enforcement system(s) 704 may be grouped into a single identity and used to backup and endorse each other. Rings may be associated with other rings to create a network of devices including any oracles. The rings may be a collection of individual device public keys (as opposed to a new key). If there are not many shared devices in the network, the list of devices may be short because of the potential for increased computational and bandwidth resources that may be expended, and may introduce a time cost for encrypting a transaction with all cryptographic keys on a device list.

In an example embodiment, a device TEE 708 is a software program that executes in a hardware secured TEE. The device TEE 708 is specially designed to execute cryptographic functions without compromise from malware or even the device operator. OEM (Original Equipment Manufacturer) 723 is the entity that built the user device and/or a Trusted Application Manager (TAM) authorized to cryptographically vouch for the provenance of the device.

Figure 7C:
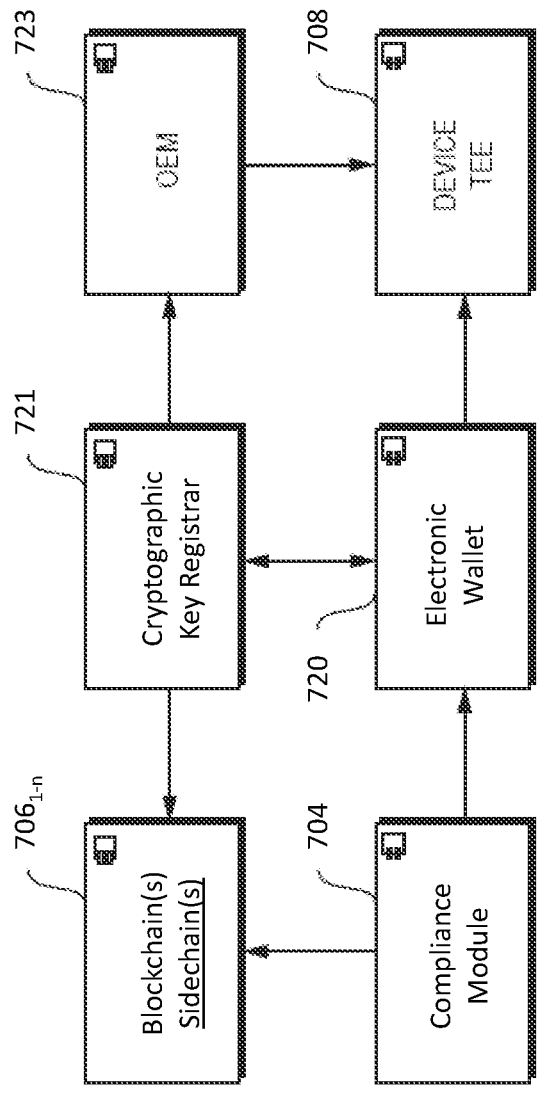
FIG. 7C is a diagram of the example device authentication system coupled with the example system components according to an embodiment.

In an embodiment, when an electronic wallet 720 shown in FIG. 7C runs for the first time to process an NFT, it will ask the device TEE 708 to generate the cryptographic key. Each digital asset is signed by the node that deposits the asset into a locker with their signature and is thereby locked. For a node to then interact with the asset on the network on which it is locked, the node must unlock the asset with a cryptographic signature. Registration may involve confirmation from the device operator. The registrar may ask the device for a Device Measurement Record which includes one or more of the following: a composite value of the Platform Configuration Registers (PCRs) generated by the boot process, BIOS version, OS version, GPS (Global Positioning System) location, among other examples. This data may be signed by the cryptographic key. It may be further signed by the registrar. The resulting data set may become the gold reference or reference value for future integrity checks. Confirmation from the device operator may be required in collecting the gold reference or reference value. This data set may be posted into a public cryptographic ledger. The public record may establish cryptographic proof of the time of registration along with the endorsement of the registrar. The registration may further include attribute data, such as location or company name or device make/model. The registration may reference a signed document that sets out the policy terms of the registrar at the time of registration. The cryptographic key registrar 721, or another trusted integrity server, may create a blockchain account key (a public/private key pair) that can be referenced as a signatory in a multi-signature transaction on the blockchain. A signatory may indicate that the value represented in the blockchain transaction cannot be spent or transferred unless co-signed by the registrar.

The blockchain(s)/sidechain(s) $706_{1-n}$ may be a JSON (JavaScript Object Notation) API written in Python, which uses the third-party agent/process private key to enroll the identity cryptographic keys of devices 705 and system 700. During enrollment, the public key of the user device 705 or system 700 is recorded by the TEE applet 708. Enrollment enables the TEE applet 708 to pair a device 705 with compliance enforcement system 704. In one embodiment, the result of pairing is that a user device 705 has a service public key, endorsed by a third-party agent/process and can therefore respond to compliance enforcement system 704 instructions.

Figure 7D:
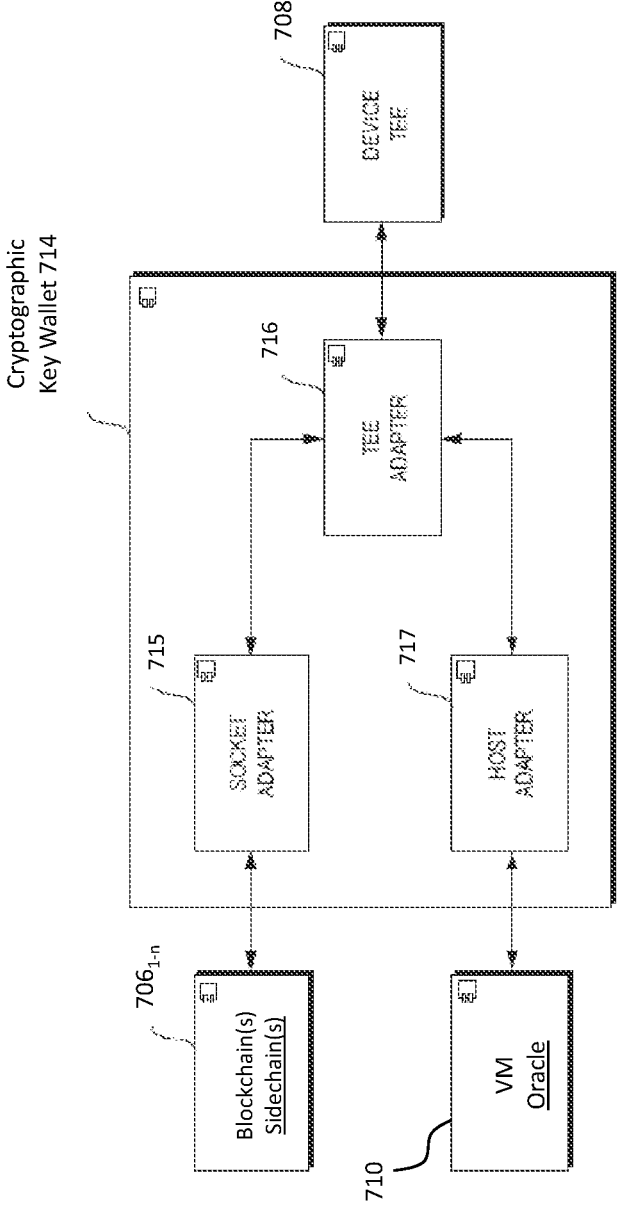
FIG. 7D is a diagram of the example device authentication system adapter and its outward and inward-looking interfaces according to an embodiment.

In an embodiment, the cryptographic key wallet 714 of FIG. 7B may be composed of outward and inward-looking interfaces as shown in FIG. 7D. An inward-looking interface, TEE adapter 716, handles proprietary communications with system 700. A host adapter 717 is provided to expose services to third-party applications. The host adapter 717 may present the interface of the cryptographic key wallet 714 through different local contexts, such as browsers or system services. Multiple realizations for diverse contexts are anticipated. A socket adapter 715 may connect the client environment blockchain(s)/sidechain(s) $706_{1-n}$. The TEE adapter 716 may be the glue that pipes commands into system 700. The cryptographic key wallet 714 may prepare message buffers that are piped to system 700, and then synchronously awaits notification of a response event. The host adapter 717 may isolate the TEE adapter 716 from the host environment. The host adapter 717, in an embodiment, may operate in a potentially hostile environment. The host adapter 717's role may be to facilitate easy access to the system 700. Instructions from a compliance enforcement system 704 intended for system 700 may be signed by compliance enforcement system 704 and then passed through to the TEE adapter 716 and system 700.

The blockchain(s)/sidechain(s) $706_{1-n}$ may have a special capability of being able to pair additional instances of compliance enforcement system(s) with device 705. Communications with the first blockchain(s)/sidechain(s) $706_{1-n}$ may be handled through the web API and preferably are authenticated. In one example, this is implemented with an API key. This may be implemented using an SSL key swap. In some embodiments, all requests are signed.

The system 700 provides robust security. The digital locker may be used to make it more difficult for an attacker to access the digital asset in the digital asset locker, as, if the attacker does not possess a valid cryptographic key, access to the locker will not be validated. Furthermore, system 700 may preferably be in near constant contact with all devices 705 through the socket adapter 715 shown in FIG. 7C.

In an embodiment, blockchain(s)/sidechain(s) $706_{1\text{-}n}$ may comprise several sub-components. For example, each block on the blockchain(s)/sidechain(s) $706_{1\text{-}n}$ may contain hashes, a height, nonce value, confirmations, and/or a Merkle Root, among other examples.

Figure 8A:
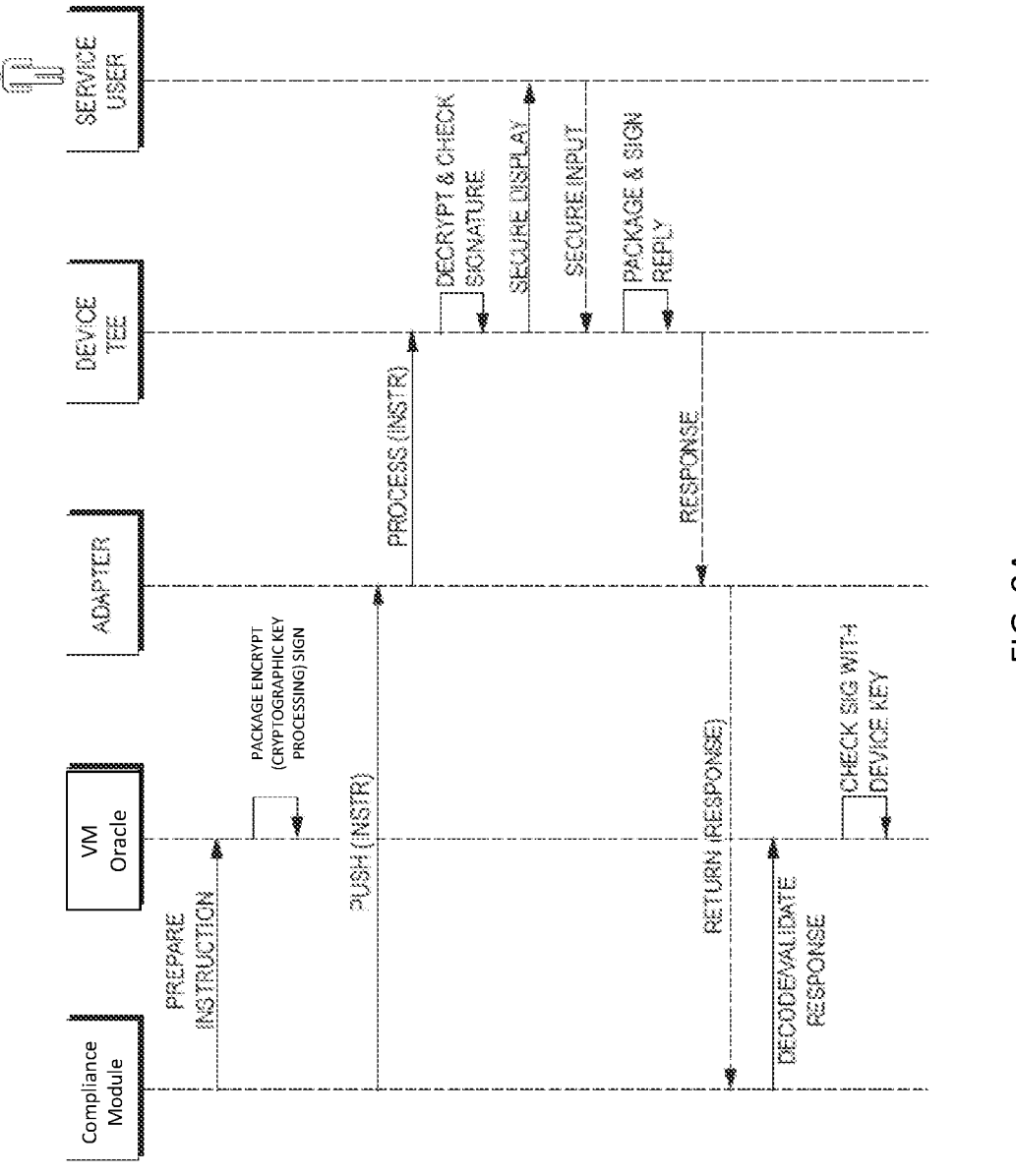
FIG. 8A is a diagram of a sequence of packaging and delivering an instruction according to an embodiment.

In an embodiment, a sequence of packaging and delivering an instruction is shown in FIG. 8A. The compliance enforcement system 704 may generate an instruction record with the help of the VM oracle 710 libraries. The instruction may include the type, the target device, and payload. The instruction may be encoded with one or more cryptographic keys. The cryptographic key is fetched from the blockchain(s)/sidechain(s) $706_{1\text{-}n}$, by looking up the device registration record.

Figure 8B:
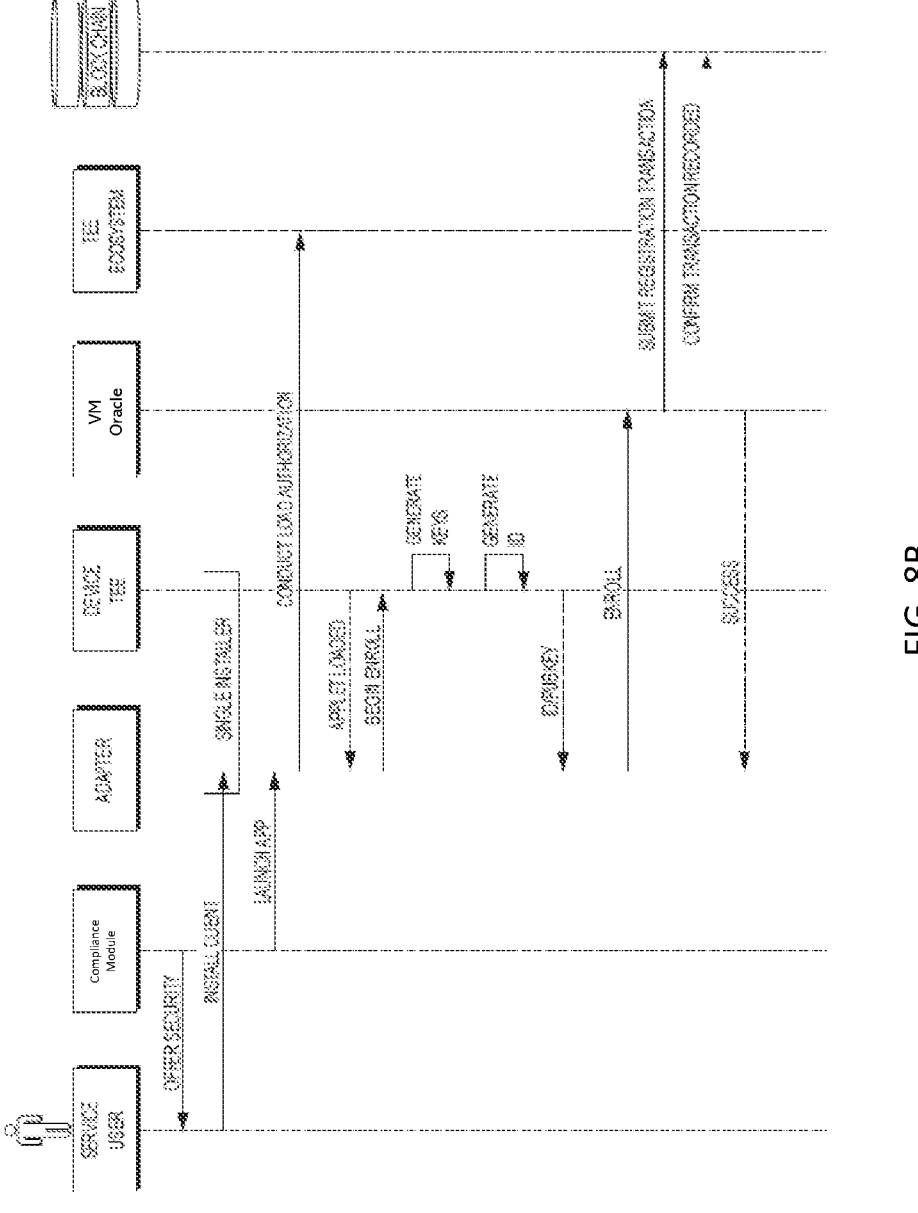
FIG. 8B is a diagram of a device enrollment process according to an embodiment.

In an embodiment, device enrollment may be performed. An example enrollment process, shown in FIG. 8B, should be hassle free, or even transparent to the user. This embodiment may ensure that system 700 is operating in a proper TEE.

Figure 9:
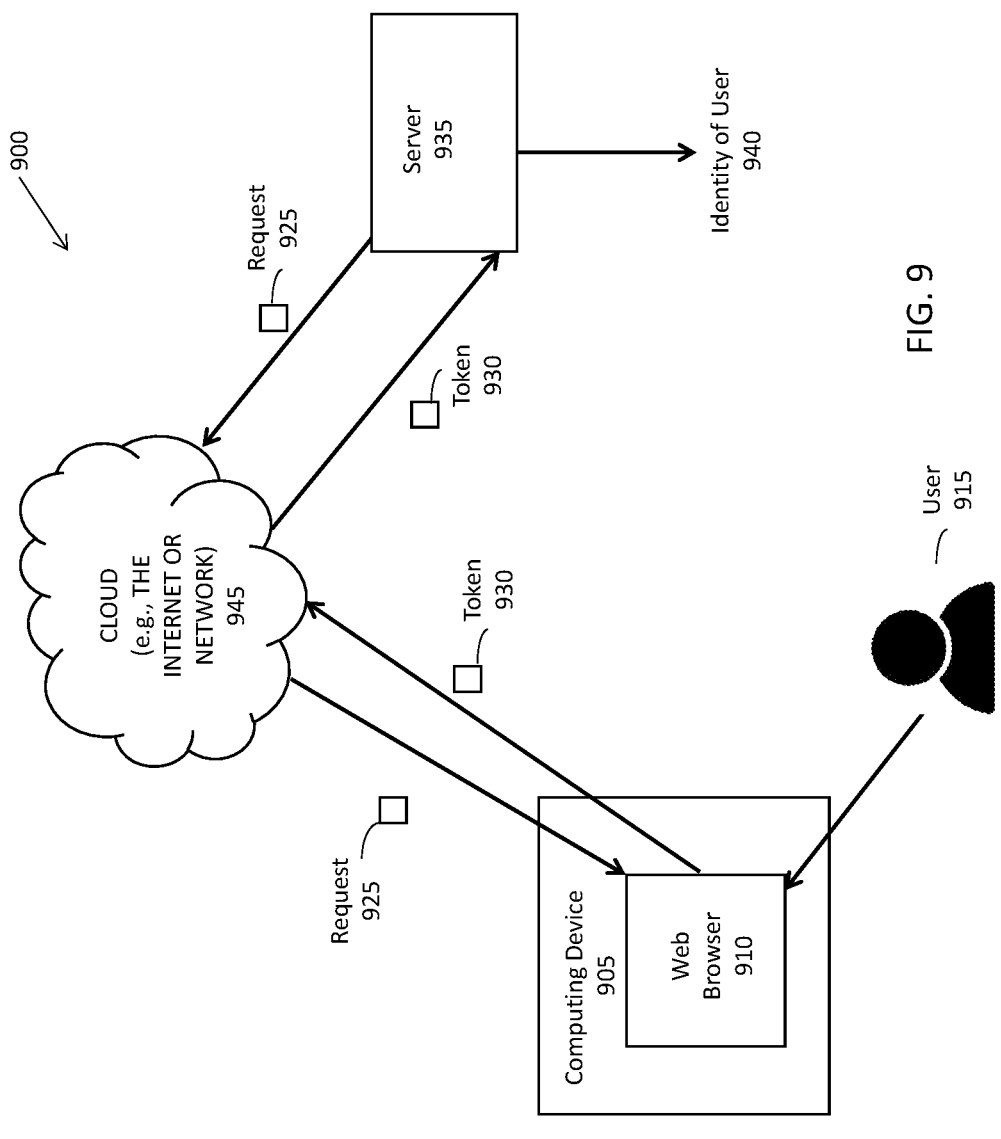
FIG. 9 is a simplified block diagram of an example user identification system according to an embodiment.

FIG. 9 shows an example of a user identification system 900 according to an embodiment. A user 915 interacts via user input 920 with a website displayed via a web browser 910 running on computing device 905, such as clicking an advertisement on the displayed website. The interaction is communicated to server (token server) 935. For example, a transparent pixel or script may be placed on the displayed website to communicate the interaction to the server 935.

An application executing on the server 935 determines whether the user 915 is a software robot or a person user by issuing a request 925 to web browser 910 to produce a token. The request 925 is sent over a network 245. In response to request 925, web browser 910 produces a token 930 on computing device 905. The token 930 is sent to the server 935 over network 945. The application executing on server 935 determines (e.g., using a computational challenge) a computational cost of producing the token 930. In some embodiments, the computational cost of producing the token 930 is based on the time taken to produce the token 930. Based on the computational cost of producing the token 930, the application on server 935 determines (deciphers) whether the user 915 is a software robot or a person user. In some embodiments, proving the computational cost of producing the token 930 at the computing device 905 is performed by an independent third party, rather than the application executing on server 935.

An application that determines whether the user 915 is software robot or a person user may also exist locally on the computing device 905. In this embodiment, it would not be necessary to send request 925 or token 930 over a network 945.

In some embodiments, the request 925 is issued in response to particular user engagement in the web browser 910 and based on user engagement metrics, including mouse movements by the user. The request 925 can also be issued in response to an elapsed period of time or issued by a web service.

In some embodiments the application on server 935 of FIG. 9 calculates a confidence score and metrics associated with whether the user 915 operating computing device 905 is at least in part by a software robot or a person user. Once the application on server 935 determines whether user 915 is a software robot or a person user, the application on server 935 returns the identity of the user 940 and a calculated confidence score, which is associated with a likelihood of whether computing device 905 is being operated by a software robot or a person user. Thus, the calculated confidence score indicates a confidence value regarding the user identification. The confidence score helps the relying party determine a measure of confidence about the identity of the user 940.

The confidence score can be based on many different factors. One factor is the computational cost of the produced token 930. If the proven computation cost is low (below a threshold value), the confidence score may be increased. Further, if computing device 905 is a server, the computational cost is higher than if the computing device 905 is an individual machine, and thus the confidence score may be increased. The confidence score may be based on the time it took computing device 905 to produce the token 930. For example, longer times (e.g., above a time threshold) for producing token 930 may be associated with a higher likelihood that the identity of the user 940 is a software robot and a lower likelihood that the identity of the user 940 is a person user. In another embodiment, the confidence score is increased if the computing device 905 includes a TPM (Trusted Platform Module).

According to some embodiments, produced token 930 is captured in a cookie. In an embodiment, the captured produced token and the computational cost of the captured produced token 930 are time sensitive and expire after a period of time. Captured cookies can sign cookies generated in the future thus, building up proof of whether the web browser 910 running on computing device 905 is being operated by a person user or a bot. The building up of proof results in a longer block chain, making it increasingly difficult for a web browser running on a machine that is operated by a bot to continue to produce tokens.

In some embodiments, the confidence score may be calculated to further consider the confirmed purchase activities of the user. The score may increase when determined that a user is a verified purchaser who previously completed an online purchase. The proof of a user being an online purchaser, such as a retrieved proof of purchase cookie associating the user's identity to an entry in a database of confirmed purchases may increase the confidence score. For example, a retrieved proof of purchase cookie associating the user's identity particularly to a persistent entry in a block chain database of confirmed purchases may further increase the confidence score. That is, the trusted confirmation of the user as a verified purchaser may be associated with a higher likelihood (confidence) that the identity of the user is a person (rather than a software robot).

FIG. 10 is a flow diagram of an exemplary computer-based system/method 1000 for permissioning private transactions on a public blockchain network. The system/method 1000 begins by establishing 1001 a network comprising a policy enforcement system, the network being configured to use one or more zero-knowledge proofs to ensure that the private transactions comply with one or more predefined policies. The system/method 1000 continues by facilitating 1002 management of at least one user identity by issuing at least one decentralized private credential to a verified user. Next, the system/method 1000 facilitates 1003 addition of one or more identity assertions to a decentralized private credential by its associated user. Finally, the system/method 1000 facilitates 1004 proof of said identity assertions by the user using one or more zero-knowledge proofs.

Further example embodiments disclosed herein may be configured using a computer program product; for example, controls may be programmed in software for implementing example embodiments. Further example embodiments may include a non-transitory computer-readable medium containing instructions that may be executed by a processor which, when loaded and executed, cause the processor to complete methods described herein. It should be understood that elements of the block and flow diagrams may be implemented in software or hardware, such as via one or more arrangements of circuitry of FIG. 6, disclosed above, or equivalents thereof, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer-readable medium, such as random-access memory (RAM), read-only memory (ROM), compact disk read-only memory (CD-ROM), and so forth. In operation, a general-purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

It should be understood that the term "blockchain" as used herein includes all forms of electronic, computer-based distributed ledgers. These include consensus-based blockchain and transaction-chain technologies, permissioned and un-permissioned ledgers, shared ledgers and variations thereof. While Bitcoin and Ethereum may be referred to herein for the purpose of convenience and illustration, it should be noted that the disclosure is not limited to use with the Bitcoin or Ethereum blockchains and alternative blockchain implementations and protocols fall within the scope of the present disclosure.

It should also be noted that not all currently known distributed ledger systems utilize linear blockchains as such. Some known blockchain implementations utilize lattice or mesh data structure(s), and some utilize directed acyclic graphs (DAGs).

While example embodiments have been particularly shown and described, it will be understood by those skilled in the art that various changes in form and details may be made therein without departing from the scope of the embodiments encompassed by the appended claims.

What is claimed is:

1. A computer-based system on a public blockchain network, the computer-based system comprising:

a public blockchain network configured to enable permissioning of private transactions, the public blockchain network including:

a blockchain privacy network having multiple nodes, at least one of the multiple nodes of the blockchain privacy network having a computer processor configured to execute a policy enforcement computing system, the policy enforcement computing system configured to:

using at least one compliance zero-knowledge proof, enforce compliance of at least one private transaction with at least one predefined policy, the private transaction occurring on the public blockchain network;

control at least one user identity by issuing a decentralized private credential (DPC) to a verified user;

integrate at least one identity assertion into the decentralized private credential (DPC), the at least one identity assertion associated with the verified user; and using at least one verification zero-knowledge proof, verify the at least one identity assertion;

wherein the policy enforcement computing system is on the blockchain privacy network and is configured to manage transactions by verifying that the transaction complies with at least one programmable policy that determines whether the transaction is compliant;

wherein the blockchain privacy network is configured to facilitate policy enforcement using zero-knowledge by combining the policy enforcement computing system with a transaction privacy system; and wherein the policy enforcement computing system is configured to use dedicated domain-specific language for specifying policy requirements.

2. The computer-based system of claim 1, wherein the policy enforcement computing system is implemented on a compliance layer, said compliance layer implemented on at least one of a trusted platform module, a hardware security module, an oracle, and a virtual machine.

3. The computer-based system of claim 2, wherein the policy enforcement computing system enforces at least one predefined policy, the at least one policy of the policy enforcement computing system is configured to enable a user to selectively reveal information to another party on the blockchain.

4. The computer-based system of claim 1, further configured to allow for identity discovery of parties on the blockchain, the computer-based system being further configured to:

establish an identity on the network by constructing a derived personal identity verification credential;

identify and remove duplicate derived personal identity verification credentials;

verify derived personal identity verification credentials; and discover identities of parties on the blockchain based on their verified derived personal identity verification credentials.

5. The computer-based system of claim 2, wherein the policy enforcement computing system is on the blockchain privacy network and is further configured to use an optimistic rollup-based approach for computing a large number of transactions.

6. The computer-based system of claim 4, wherein the policy enforcement computing system is located on the blockchain privacy network and manages user identities using decentralized private credentials.

7. The computer-based system of claim 4, wherein the policy enforcement computing system is on the blockchain privacy network and is configured to operate a distributed user discoverability network in combination with identity management;

the policy enforcement computing system is further configured to record each identity using a decentralized private credential, said decentralized private credential comprising at least one of: proof-of-ownership of specific wallets, verified ownership of an email address, verified ownership of a phone number, and full government-ID-verified know-your-customer assertions made by trusted identity providers.

8. The computer-based system of claim 1, wherein the policy enforcement computing system is further configured to process information in a certificate or a transaction in a manner reconfigurable by a user.

9. The computer-based system of claim 1, wherein the policy enforcement computing system is on the blockchain privacy network, and the blockchain privacy network comprises a programmable zero-knowledge smart contract.

10. The computer-based system of claim 1, wherein the policy computing enforcement system is on the blockchain privacy network, the blockchain privacy network configured to allow individual senders and recipients to opt into policy enforcement.

11. The computer-based system of claim 1, wherein the computer processor is a secure cryptoprocessor implemented with a CPU/Zero Knowledge Processing Unit (ZPU) having an embedded optimistic Zero Knowledge verifier based hardware accelerator.

12. The computer-based system of claim 1, wherein the blockchain privacy network is further configured to manage user identity by recoding each user identity using Decentralized Private Credentials (DPC) to create an accretive and nontransferable record binding to a single user, the Decentralized Private Credentials (DPC) including a set of assertions about the user including at least one proofs-of-ownership of specific wallets on one or more computing networks, verified ownership of an email address, a phone number attested to by a validator committee, and full government-ID-verified know your wallet (KYC) assertions made by trusted identity providers; wherein the assertions are stored on-chain in an encrypted format.

13. The system of claim 1 wherein one or more of the plurality of servers include a hybrid crypto processor unit with an embedded encapsulated privacy computer system having a Zero Knowledge Processing Unit (ZPU) based hardware accelerator optimized to improve packet processing for permissioning of private transactions on the blockchain privacy network.

14. A computer-based system on a public blockchain network, the computer-based system comprising:
a public blockchain network configured to enable permissioning of private transactions, the public blockchain network including:
a blockchain privacy network having multiple nodes,
at least one of the multiple nodes of the blockchain privacy network having a computer processor configured to execute a policy enforcement computing system,
the policy enforcement computing system configured to:
using at least one compliance zero-knowledge proof, enforce compliance of at least one private transaction with at least one predefined policy, the private transaction occurring on the public blockchain network;
control at least one user identity by issuing a decentralized private credential (DPC) to a verified user;
integrate at least one identity assertion into the decentralized private credential (DPC), the at least one identity assertion associated with the verified user; and
using at least one verification zero-knowledge proof, verify the at least one identity assertion;
wherein the at least one transaction is organized into a sealed pool, where a pool-wide policy is enforced by ensuring that each user has a decentralized private credential (DPC) identity of a sufficient grade for transacting in the sealed pool.

15. The computer-based system of claim 14, wherein the policy enforcement computing system is on the blockchain privacy network and is configured to manage transactions by verifying that at least one of the transactions complies with at least one programmable policy that determines whether the transaction is compliant.

16. The computer-based system of claim 15, wherein the policy enforcement computing system is on the blockchain privacy network, the blockchain privacy network configured to facilitate policy enforcement using zero-knowledge by combining the policy enforcement computing system with a transaction privacy system; and
the policy enforcement computing system is further configured to use dedicated domain-specific language for specifying policy requirements.

17. The computer-based system of claim 14, wherein a transaction is organized into a sealed pool and a pool-wide policy is enforced by placing limitations on transaction amounts according to identity quality.

18. The computer-based system of claim 14, wherein a transaction is organized into a sealed pool and a pool-wide policy is enforced by enabling investigatory capability as a user opt-in.

19. A computer-based method on a public blockchain network, the computer-based method comprising:
configuring a public blockchain network to enable permissioning of private transactions, the public blockchain network including:
configuring a blockchain privacy network having multiple nodes,
configuring at least one of the multiple nodes of the blockchain privacy network having a computer processor to execute a policy enforcement computing system,
configuring the policy enforcement computing system to:
using at least one compliance zero-knowledge proof, enforce compliance of at least one private transaction with at least one predefined policy, the private transaction occurring on the public blockchain network;
control at least one user identity by issuing a decentralized private credential (DPC) to a verified user;
integrate at least one identity assertion into the decentralized private credential (DPC), the at least one identity assertion associated with the verified user; and
using at least one verification zero-knowledge proof, verify the at least one identity assertion;
wherein the at least one transaction configured into a sealed pool, where a pool-wide policy is enforced by ensuring that each user has a decentralized private credential (DPC) identity of a sufficient grade for transacting in the sealed pool.

20. The computer-based method of claim 19, wherein the blockchain privacy network is configured to enable a user to verify the assertions using a zero-knowledge succinct non-interactive argument of knowledge (zkSNARK) proof; and
wherein the blockchain privacy network is further configured to require know your customer (KYC)/identity attestations to process transactions, enabling interaction between permissioned applications and open decentralized assets/applications.

21. The computer-based method of claim 20, wherein the blockchain privacy network includes a policy enforcement computing system configured to enforce privacy policies using a zero-knowledge proof, such that privacy policy enforcement is executed without the policy enforcement computing system revealing private information related to the transaction including an amount, recipient, and sender data related to the transaction.

22. The computer-based method of claim 20, wherein the blockchain privacy network is be configured to implement transaction privacy using an unspent transaction output (UTXO)-based payment privacy layer derived from zero-knowledge succinct non-interactive argument of knowledge (zkSNARK) proofs, this layer focusing primarily on the transfer of value between accounts, enabling users to access (nonprivate) decentralized finance (DeFi) systems using private transfers of funds.

23. A computer-based method in a public blockchain network, the computer-based method comprising:

permissioning private transactions by applications on a public blockchain by:

using a blockchain privacy network having multiple nodes, at least one of the multiple nodes of the blockchain privacy network having a secure cryptoprocessor implemented as a dedicated microprocessor configured to execute a policy enforcement computing system;

using one or more compliance zero-knowledge proof enforce compliance of at least one private transaction with at least predefined policy, the private transaction occurring on the public blockchain network;

controlling at least one user identity by issuing a decentralized private credential (DPC) to a verified user;

integrating at least one identity assertion into the decentralized private credential (DPC), the at least one identity assertion associated with the verified user; and verifying the at least one identity assertions;

wherein the policy enforcement computing system is on the blockchain privacy network and is configured to manage transactions by computationally verifying that the transaction complies with at least one programmable policy that determines whether the transaction is compliant;

wherein the blockchain privacy network is configured to facilitate policy enforcement using zero-knowledge by combining the policy enforcement computing system with a transaction privacy system; and the policy enforcement computing system is further configured to use dedicated domain-specific language for specifying policy requirements.

24. The computer-based method of claim 23, wherein the policy enforcement computing system is configured to be implemented on a compliance layer, said compliance layer configured on at least one of a trusted platform module, a hardware security module, an oracle, and a virtual machine.

25. The computer-based method of claim 24, wherein the policy enforcement computing system is configured to enforce at least one predefined policy, the at least one policy of the policy enforcement computing system is configured to enable a user to selectively reveal information to another party on the blockchain.

26. The computer-based method of claim 24, wherein the policy enforcement computing system is on the blockchain privacy network and is further configured to use an optimistic rollup-based approach for computing a large number of transactions.

27. The computer-based method of claim 23, further configured to allow for identity discovery of parties on the blockchain, the computer-based method further configured to:

establish an identity on the network by constructing a derived personal identity verification credential;

identify and remove duplicate derived personal identity verification credentials;

verify derived personal identity verification credentials; and discover identities of parties on the blockchain based on their verified derived personal identity verification credentials.

28. The computer-based method of claim 27, wherein the policy enforcement computing system is located on the blockchain privacy network and manages user identities using decentralized private credentials.

29. The computer-based method of claim 27, wherein the policy enforcement computing system is on the blockchain privacy network and is configured to operate a distributed user discoverability network in combination with identity management; and configuring the policy enforcement computing system to record each identity using a decentralized private credential, said decentralized private credential comprising at least one of: proof-of-ownership of specific wallets, verified ownership of an email address, verified ownership of a phone number, and full government-ID-verified know-your-customer assertions made by trusted identity providers.

30. The computer-based method of claim 23, wherein the policy enforcement computing system is further configured to process information in a certificate or a transaction in a manner reconfigurable by a user.

31. The computer-based system of claim 14, wherein the policy enforcement computing system is on the blockchain privacy network and is configured to manage transactions by computationally verifying that the transaction complies with at least one programmable policy that determines whether the transaction is compliant.

32. The computer-based method of claim 23, wherein the policy enforcement computing system is on the blockchain privacy network, and the blockchain privacy network comprises a programmable zero-knowledge smart contract.

33. The computer-based method of claim 23, wherein the policy enforcement computing system is on the blockchain privacy network, the blockchain privacy network configured to allow individual senders and recipients to opt into policy enforcement.

34. The computer-based method of claim 23, wherein the policy enforcement computing system is on the blockchain privacy network, the blockchain privacy network configured to facilitate policy enforcement using zero-knowledge by combining the policy enforcement computing system with the transaction privacy method; and configuring the blockchain privacy network to use dedicated domain-specific language for specifying policy requirements.

35. The computer-based method of claim 23, wherein a transaction is organized into a sealed pool, where a pool-wide policy is enforced by ensuring that each user has a Decentralized Private Credentials (DPC) identity of a sufficient grade for transacting in the sealed pool.

36. The computer-based method of claim 35, wherein a transaction is organized into a sealed pool and a pool-wide policy is enforced by placing limitations on transaction amounts according to identity quality.

37. The computer-based method of claim 35, wherein a transaction is organized into a sealed pool and a pool-wide policy is enforced by enabling investigatory capability as a user opt-in.

38. The computer-based method of claim 23, wherein the computer processor is a secure cryptoprocessor implemented with a CPU/Zero Knowledge Processing Unit (ZPU) having an embedded optimistic Zero Knowledge verifier based hardware accelerator.

39. The computer-based method of claim 23, wherein the blockchain privacy network is further configured to manage user identity by recoding each user identity using Decentralized Private Credentials (DPC) to create an accretive and nontransferable record binding to a single user, the Decentralized Private Credentials (DPC) including a set of assertions about the user including at least one proofs-of-ownership of specific wallets on one or more computing networks, verified ownership of an email address, a phone number attested to by a validator committee, and full government-ID-verified know your wallet (KYC) assertions made by trusted identity providers; wherein the assertions are stored on-chain in an encrypted format.

40. The computer-based method of claim 23, further enabling a user to verify the assertions using a zero-knowledge succinct non-interactive argument of knowledge (zkSNARK) proof;

configuring the blockchain privacy network to provide a cross-network method for building and proving identity, which is used on external decentralized or centralized method.

41. The computer-based method of claim 40, wherein the blockchain privacy network is further configured to require know your customer (KYC)/identity attestations to process transactions, enabling interaction between permissioned applications and open decentralized assets/applications.

42. The computer-based method of claim 40, wherein the blockchain privacy network includes a policy enforcement system configured to enforce privacy policies using a zero-knowledge proof, such that privacy policy enforcement is executed without the policy enforcement computing system revealing private information related to the transaction including an amount, recipient, and sender data related to the transaction.

43. The computer-based method of claim 40, wherein the blockchain privacy network is configured to implement transaction privacy using an unspent transaction output (UTXO)-based payment privacy layer derived from zero-knowledge succinct non-interactive argument of knowledge (zkSNARK) proofs, this layer focusing primarily on the transfer of value between accounts, enabling users to access (nonprivate) decentralized finance (DeFi) methods using private transfers of funds.

* * * * *